US010865721B1

(12) United States Patent
Thomas et al.

(10) Patent No.: US 10,865,721 B1
(45) Date of Patent: Dec. 15, 2020

(54) METHOD AND SYSTEM FOR MEASURING AND BALANCING CYLINDER AIR-FUEL RATIO

(71) Applicant: Ford Global Technologies, LLC, Dearborn, MI (US)

(72) Inventors: Joseph Lyle Thomas, Farmington Hills, MI (US); Ross Dykstra Pursifull, Dearborn, MI (US); Michael James Uhrich, Wixom, MI (US); William Charles Ruona, Farmington Hills, MI (US); Giovanni Cavataio, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/680,249

(22) Filed: Nov. 11, 2019

(51) Int. Cl.
| | | |
|---|---|---|
| F02D 41/00 | (2006.01) | |
| F02D 41/14 | (2006.01) | |
| F01N 3/08 | (2006.01) | |
| F01N 3/20 | (2006.01) | |
| F02P 5/04 | (2006.01) | |
| F02D 41/24 | (2006.01) | |

(52) U.S. Cl.
CPC ....... *F02D 41/0085* (2013.01); *F01N 3/0842* (2013.01); *F01N 3/208* (2013.01); *F02D 41/009* (2013.01); *F02D 41/0042* (2013.01); *F02D 41/1402* (2013.01); *F02P 5/045* (2013.01); *F01N 2610/02* (2013.01); *F01N 2610/1406* (2013.01); *F01N 2900/1402* (2013.01); *F01N 2900/1622* (2013.01); *F02D 41/2467* (2013.01); *F02D 2200/021* (2013.01); *F02D 2200/101* (2013.01); *F02D 2200/1002* (2013.01); *F02D 2250/18* (2013.01); *F02D 2250/36* (2013.01)

(58) Field of Classification Search
CPC .................................................. F02D 41/0085
USPC ........................................................ 701/111
See application file for complete search history.

(56) References Cited

U.S. PATENT DOCUMENTS

| | | | | |
|---|---|---|---|---|
| 7,802,563 B2* | 9/2010 | Behr | ................... | F02D 41/0082 123/692 |
| 8,534,237 B2* | 9/2013 | Iwatani | ..................... | F01N 5/02 123/1 A |
| 8,720,417 B1* | 5/2014 | Iwatani | ............... | F02D 41/3094 123/436 |
| 8,768,546 B2* | 7/2014 | Bottlang | ................... | B61C 9/14 701/20 |
| 8,862,370 B2* | 10/2014 | Theis | .................... | F02D 41/027 701/112 |
| 9,222,420 B2* | 12/2015 | Kerns | ................... | F01N 13/011 |

(Continued)

*Primary Examiner* — Kevin R Steckbauer
(74) *Attorney, Agent, or Firm* — Geoffrey Brumbaugh; McCoy Russell LLP

(57) ABSTRACT

Methods and systems are provided for operating an engine to diagnose and compensate for cylinder imbalance in an engine. In one example, a method may include diagnosing a torque imbalance in a multi-cylinder engine by operating the engine at a lean air-fuel ratio (AFR) while an amount of ammonia stored in an selective catalytic reduction (SCR) system is greater than a threshold amount and a temperature of the engine is greater than a threshold temperature; and responsive to the diagnosed torque imbalance, adjusting fueling and spark timing for each cylinder, the adjustments based on an AFR offset of each cylinder determined while adjusting the lean AFR.

20 Claims, 5 Drawing Sheets

(56) References Cited

U.S. PATENT DOCUMENTS

| | | | |
|---|---|---|---|
| 9,518,287 B2* | 12/2016 | Theis | F01N 13/0093 |
| 9,683,506 B2* | 6/2017 | Jammoussi | F02D 41/1495 |
| 9,759,148 B2* | 9/2017 | Jammoussi | F02D 41/0085 |
| 9,765,715 B2* | 9/2017 | Hohner | F02D 41/146 |
| 9,879,627 B2* | 1/2018 | Glugla | F02D 41/08 |
| 10,077,727 B2* | 9/2018 | Sczomak | F02D 41/3005 |
| 10,208,686 B1* | 2/2019 | Thomas | F02D 41/2451 |
| 10,330,035 B2* | 6/2019 | Martin | F02D 41/144 |
| 10,337,430 B2* | 7/2019 | Jammoussi | F02D 41/123 |
| 10,563,602 B2* | 2/2020 | Yoshikawa | F02P 5/151 |
| 10,570,844 B2* | 2/2020 | Rollinger | F02D 41/2458 |
| 10,677,180 B2* | 6/2020 | Yoshikawa | F02P 5/15 |
| 2009/0241925 A1* | 10/2009 | Behr | F02D 41/1443 123/690 |
| 2011/0264355 A1* | 10/2011 | Iwatani | F02M 69/046 701/103 |
| 2012/0004830 A1* | 1/2012 | Miyagawa | F02D 19/081 701/103 |
| 2012/0004831 A1* | 1/2012 | Miyagawa | F02D 41/062 701/103 |
| 2012/0035791 A1* | 2/2012 | Bottlang | B61L 25/025 701/20 |
| 2013/0184969 A1* | 7/2013 | Rollinger | F02D 41/22 701/103 |
| 2014/0013726 A1* | 1/2014 | Yacoub | F01N 3/32 60/274 |
| 2014/0039778 A1* | 2/2014 | Kerns | F02D 41/0235 701/103 |
| 2014/0039781 A1* | 2/2014 | Theis | C12Q 1/6806 701/112 |
| 2015/0027107 A1* | 1/2015 | Theis | F01N 13/0093 60/274 |
| 2016/0097334 A1* | 4/2016 | Glugla | F02D 41/0097 123/294 |
| 2016/0258376 A1* | 9/2016 | Jammoussi | F02D 41/123 |
| 2016/0290262 A1* | 10/2016 | Hohner | F02D 41/1475 |
| 2016/0333809 A1* | 11/2016 | Jammoussi | F02D 41/123 |
| 2017/0198652 A1* | 7/2017 | Sczomak | F02D 13/00 |
| 2017/0350332 A1* | 12/2017 | Martin | F02D 41/1495 |
| 2017/0356363 A1* | 12/2017 | Jammoussi | F02D 41/222 |
| 2019/0170072 A1* | 6/2019 | Yoshikawa | F02P 5/15 |
| 2019/0170108 A1* | 6/2019 | Yoshikawa | F02D 41/0085 |

* cited by examiner

METHOD AND SYSTEM FOR MEASURING AND BALANCING CYLINDER AIR-FUEL RATIO

FIELD

The present description relates generally to methods and systems for determining cylinder-to-cylinder torque imbalance in an internal combustion engine of a vehicle.

BACKGROUND/SUMMARY

Engine emissions compliance includes detection of air-fuel ratio (AFR) imbalances across engine cylinders. An AFR imbalance may occur when the AFR in one or more engine cylinders is different than the other engine cylinders. For example, cylinder AFR imbalances may occur due to variation in the size and shape of air passages coupled to each cylinder, intake manifold leakage, fuel flow variability of fuel injectors coupled to each cylinder, uneven exhaust gas recirculation distribution across cylinders, and uneven purge distribution across cylinders. In addition to degrading emissions, cylinder-to-cylinder AFR imbalances may result in torque disturbances that reduce engine performance and vehicle drivability.

One example approach for detecting cylinder-to-cylinder AFR imbalances is shown by Behr et al. in U.S. Pat. No. 7,802,563. Therein, an AFR imbalance is identified based on a response of a universal exhaust gas oxygen (UEGO) sensor at frequencies that are at or above a firing frequency of the cylinders during selected operating conditions. Specifically, when the engine is not operating under transient conditions, imbalance is identified if the integration of high frequency differential signals detected by the UEGO sensor is higher than a threshold. Still other approaches for AFR imbalance detection involve detecting AFR imbalance based on an exhaust manifold pressure estimated by a pressure sensor and/or individual cylinder torque outputs estimated by a crankshaft torque sensor.

However, the inventors herein have recognized potential issues with such systems. As one example, when using exhaust gas sensors as in the approach of Behr, there may be conditions where cylinder-to-cylinder AFR imbalance is not detected due to insufficient mixing of exhaust gas at the exhaust gas sensor. Further, the exhaust gas sensor may not be able to reliably detect cylinder-to-cylinder AFR imbalance during an engine cold-start condition due to insufficient warm-up of the exhaust gas sensor. As another example, when using exhaust manifold pressure to detect AFR imbalance, the detection may be affected by the distance between the pressure sensor and the cylinder. With increased distance, exhaust gas from other cylinders is more likely to mix with the exhaust gas from the cylinder being evaluated. As such, the reliability these approaches may vary based on operating conditions, and any resulting adjustments from the unreliable AFR imbalance detections may result in further AFR imbalances and torque disturbances. Additionally, individual cylinder torque measurements for AFR imbalance detection relies upon measurements made while intrusively injecting a rich/lean pattern on adjacent cylinders. This means that successive cylinders inherently produce different torque signatures, which may confound imbalance measurements.

In one example, the issues described above may be addressed by a method comprising: diagnosing a torque imbalance in a multi-cylinder engine by operating the engine at a lean air-fuel ratio (AFR) while an amount of ammonia stored in an selective catalytic reduction system is greater than a threshold amount and a temperature of the engine is greater than a threshold temperature; and responsive to the torque imbalance, adjusting fueling based on an AFR offset of each cylinder determined while adjusting the lean AFR. In this way, air distribution-related AFR imbalances may be accurately identified and compensated for while using a selective catalytic reduction (SCR) system to minimize any additional NOx emissions due to enleanment.

As one example, diagnosing the torque imbalance in the multi-cylinder engine may include operating the engine at the lean AFR while determining an individual torque produced by each cylinder of the multi-cylinder engine. The individual torque produced by each cylinder may be averaged to determine a mean cylinder torque, and the imbalance may be diagnosed responsive to the individual torque produce by at least one cylinder being outside of a threshold deviation from the mean cylinder torque. The individual torque produced by each cylinder may be determined using data from a crankshaft position sensor, for example. As another example, determining the AFR offset of each cylinder while adjusting the lean AFR may include commanding a series of lean AFRs while monitoring the individual torque produced by each cylinder at each lean commanded AFR. For example, a controller may individually determine a change in the torque output of each cylinder between two consecutive commanded lean AFRs and compare a ratio of the change in the torque output and a change in the AFR between the two consecutive commanded lean AFRs to a stored torque-AFR relationship. The torque-AFR relationship may denote a linear relationship between torque and AFR. The controller may determine the AFR offset for each cylinder, which may be a difference between a commanded AFR and an operating AFR, by comparing the ratio to the stored torque-AFR. By adjusting the cylinder fueling based on the AFR offset, the operating AFR of each cylinder may be brought to the commanded AFR such that each cylinder accurately operates at a uniform AFR. As another example, after bringing the operating AFR of each cylinder to the commanded AFR through fueling adjustments, final torque balance adjustments may be made via spark timing adjustments. For example, the spark timing of any remaining imbalanced cylinder(s) may be advanced or retarded relative to the other cylinders in order to bring the individual torque of the imbalanced cylinder(s) to the mean torque, thereby resolving the relative torque imbalance.

As another example, diagnosing the torque imbalance may be performed when the engine temperature is above the threshold temperature so that entrained fuel has been released from a crankcase. Further, diagnosing the torque imbalance may be performed and purge is disabled, for example. Further still, fuel injector offsets may be learned prior to diagnosing the torque imbalance. In this way, potential sources of unmetered fuel may be reduced or eliminated so that any diagnosed torque imbalances may be attributed to AFR imbalances due to air distribution differences and not due to fuel metering.

By using existing engine sensors, such as the crankshaft position sensor, and including an SCR device in the engine system, it is possible to identify one or more distinct engine cylinders with an AFR imbalance caused by differences in air distribution between cylinders without encountering observability difficulties or increasing vehicle emissions. In particular, by diagnosing the torque imbalance while operating lean only after the amount of ammonia stored in a selective catalytic reduction system is greater than the threshold amount, NOx emissions may be reduced. By accurately identifying and correcting air distribution-related cylinder AFR imbalances, vehicle emissions may be reduced while engine smoothness may be increased, thereby increasing customer satisfaction.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
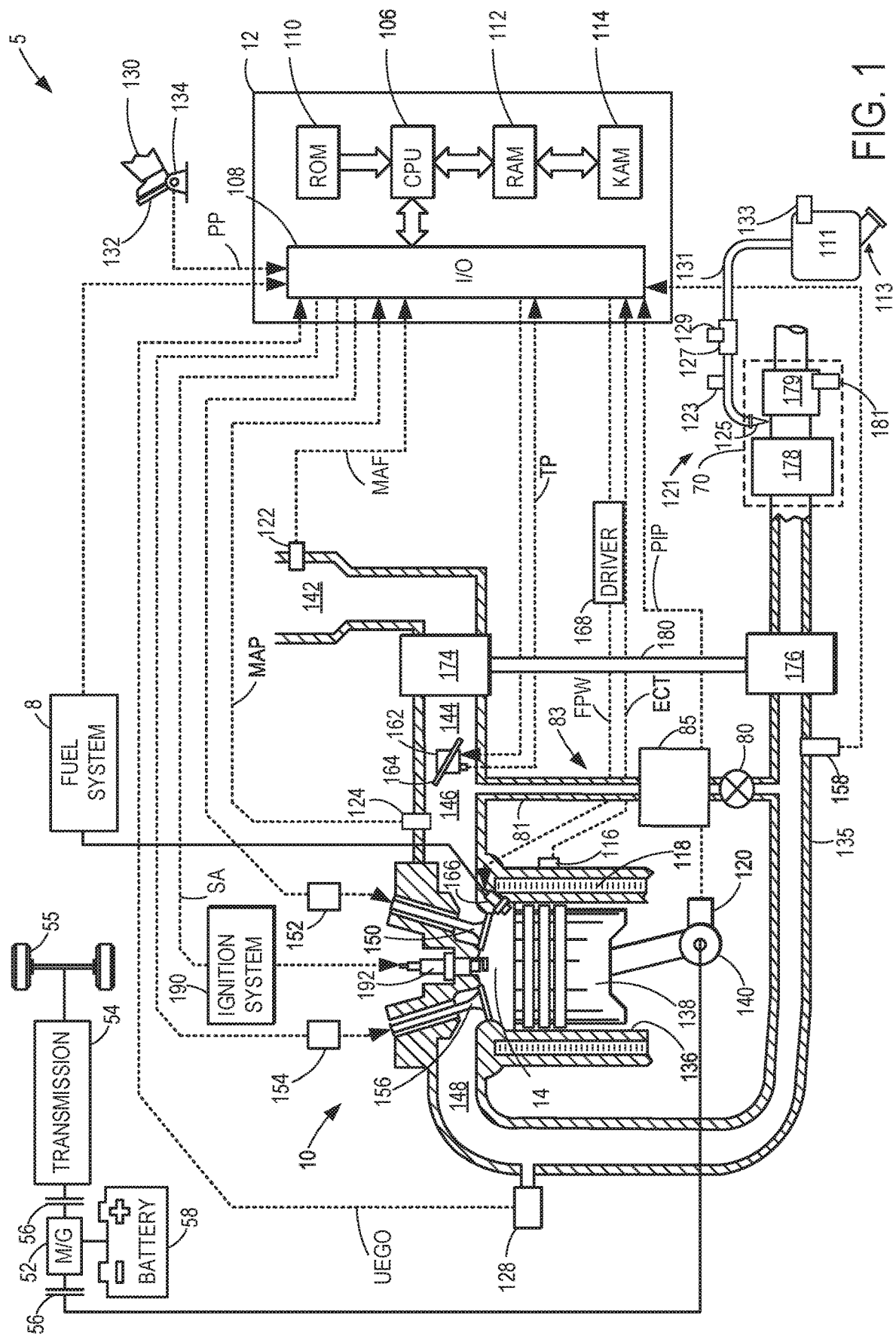
FIG. 1 shows a schematic depiction of a cylinder configuration in an engine system of a vehicle.
Figure 2:
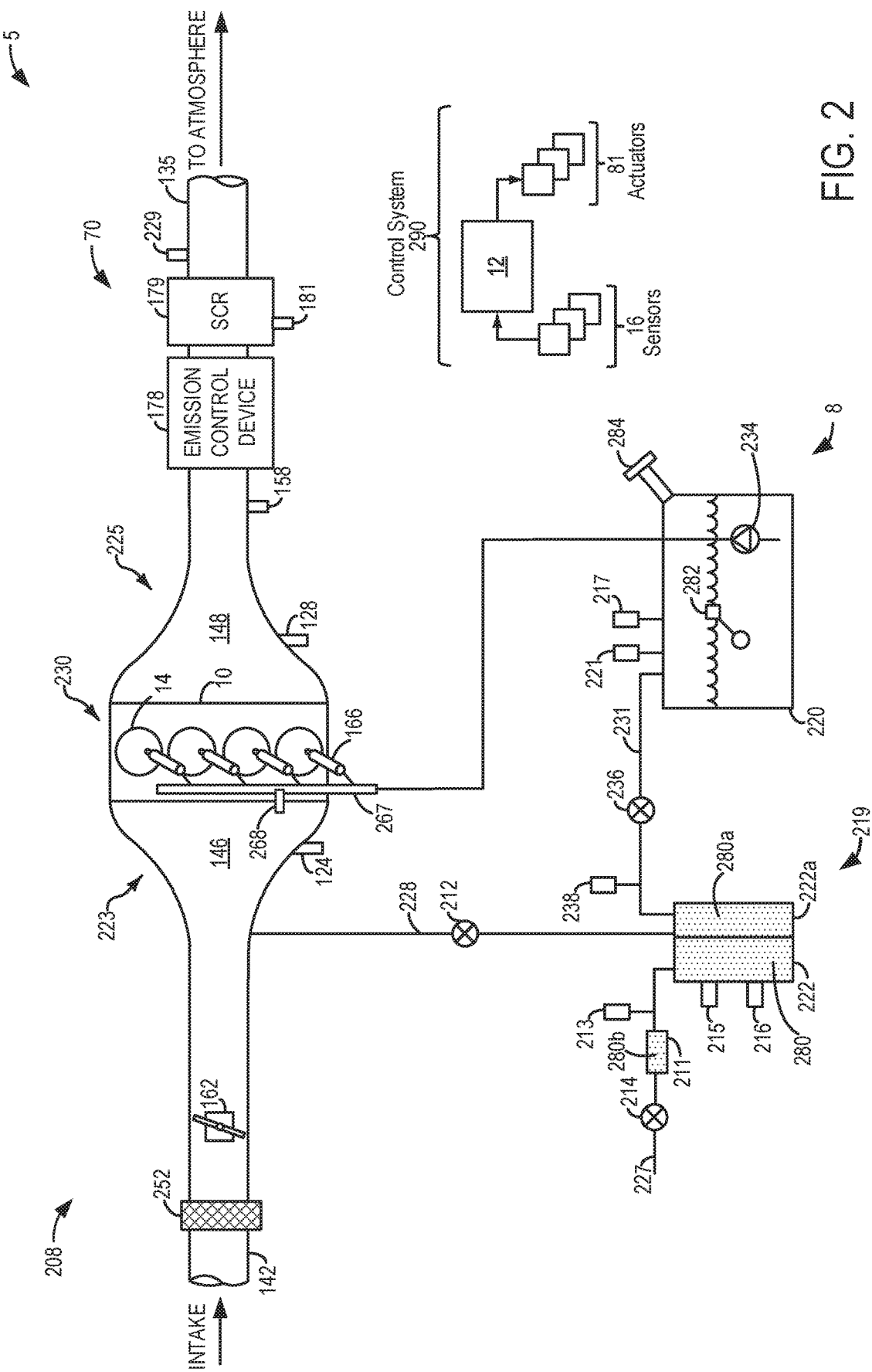
FIG. 2 shows a schematic depiction of a fuel system and evaporative emissions system coupled to an engine system.

The following description relates to systems and methods for identifying a cylinder-to-cylinder imbalance in a vehicle using cylinder torque measurements and correcting the imbalance via fuel adjustments and ignition timing adjustments. As used herein, a cylinder-to-cylinder imbalance (also referred to as a cylinder air-fuel ratio imbalance or a cylinder imbalance) may be a difference in air-fuel ratio between cylinders that occurs when all engine cylinders are commanded to operate at a uniform air-fuel ratio. FIG. 1 shows a schematic depiction of one cylinder in a multi-cylinder engine further illustrated in FIG. 2. In particular, FIG. 1 depicts an example cylinder configuration of the one cylinder, and FIG. 2 depicts a fuel system and an evaporative emissions system coupled to the multi-cylinder engine. A crankshaft position sensor coupled to a crankshaft of the engine may be utilized for sensing accelerations resulting from individual cylinder combustion events. The amount of torque produced by each cylinder (e.g., cylinder torque) may be determined based on the individual crankshaft accelerations. For example, an engine controller may be configured to perform a cylinder air imbalance test, such as the example method of FIG. 3, to identify and correct air flow-related cylinder imbalances, as shown in the example timeline of FIG. 5. Specifically, because fuel injector offsets may be prior to performing the cylinder air imbalance test and other potential sources of unmetered fuel may be discontinued during test, any detected imbalances may be attributed to differences in air distribution to the cylinders. A relationship between cylinder torque and cylinder air-fuel ratio (AFR), such as the example relationship shown in FIG. 4, may be used to determine an observed cylinder AFR based on the cylinder torque produced, and differences between the observed cylinder AFR and a commanded AFR may be used to determine fueling adjustments. A prophetic example timeline for identifying and compensating for the cylinder air imbalance is shown in FIG. 5.

FIG. 1 schematically shows an example cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as will be further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected to vehicle wheels 55 via transmission 54 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator.

Cylinder 14 of engine 10 can receive intake air via a series of intake air passages 142, and 144 and an intake manifold 146. Intake manifold 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. In some examples, exhaust turbine 176 may be a variable geometry turbine (VGT) where turbine geometry is actively varied by actuating turbine vanes as a function of engine speed and other operating conditions. In one example, the turbine vanes may be coupled to an annular ring, and the ring may be rotated to adjust a position of the turbine vanes. In another example, one or more of the turbine vanes may be pivoted individually or pivoted in plurality. As an example, adjusting the position of the turbine vanes may adjust a cross sectional opening (or area) of exhaust turbine 176. However, in other examples, such as when engine 10 is provided with a supercharger, compressor 174 may be powered by mechanical input from a motor or the engine, and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174. A throttle position sensor may be provided to measure a position of throttle plate 164.

An exhaust manifold 148 can receive exhaust gases from other cylinders of engine 10 in addition to cylinder 14. An exhaust gas sensor 128 is shown coupled to exhaust manifold 148 upstream of an emission control system 70. Exhaust gas sensor 128 may be selected from among various suitable sensors for providing an indication of an exhaust gas air/fuel ratio (AFR), such as a linear oxygen sensor or UEGO (universal or wide-range exhaust gas oxygen, as depicted), a two-state oxygen sensor or EGO, a HEGO (heated EGO), a NOx sensor, a HC sensor, or a CO sensor, for example. Herein, the AFR will be discussed as a relative AFR, defined as a ratio of an actual AFR of a given mixture to stoichiometry and represented by lambda ($\lambda$). A lambda value of 1 occurs during stoichiometric operation, wherein the air-fuel mixture produces a complete combustion reaction. A rich AFR ($\lambda < 1$) results from air-fuel mixtures with more fuel (or less air) relative to stoichiometry, whereas a lean AFR ($\lambda > 1$) results from air-fuel mixtures with less fuel (or more air) relative to stoichiometry.

Emission control system 70 may include a selective catalytic reduction (SCR) system, a three way catalyst (TWC), a lean NOx trap (LNT), various other emission control devices, or combinations thereof. In the example shown in FIG. 1, emission control system includes an emission control device 178 and an SCR 179. SCR 179 may be configured to chemically reduce nitrogen oxides (NOx) during lean operating conditions by converting NOx into diatomic nitrogen (e.g., $N_2$) and water (e.g., $H_2O$) using a reductant, such as ammonia (e.g., $NH_3$). Emission control device 178 may include a three-way catalyst configured to reduce NOx and oxidize carbon monoxide and unburnt hydrocarbons. The three-way catalyst may maximally active at an AFR of stoichiometry. For example, during rich conditions, the three-way catalyst may be unable to convert all of the hydrocarbons and carbon monoxide. As another example, during lean conditions, the three-way catalyst may be unable to convert all of the NOx. Therefore, SCR 179 may reduce NOx emissions during lean conditions. Further, in some examples, emission control device 178 may additionally include a lean NOx trap configured to adsorb NOx during lean conditions and desorb NOx during rich conditions, for example, for reduction.

In some examples, the reductant used at SCR 179 may be provided to SCR 179 in a liquid form via an injection system. However, various alternative approaches may be used, such as solid urea pellets that generate an ammonia vapor, which is then injected or metered to SCR 179. Further, in some examples, reductant (e.g., ammonia) may be generated over emission control device 178 (e.g., the TWC and the LNT) through rich engine operation. Thus, in some examples, a dedicated injection system may not be included for providing reductant to SCR 179.

In the example shown in FIG. 1, a liquid reductant dosing system 121 is included to provide liquid reductant to SCR 179. As one example, the liquid reductant may be an aqueous urea solution stored in a storage vessel, such as a storage tank 111, for onboard liquid reductant storage. A liquid reductant delivery line 123 couples storage tank 111 to exhaust passage 135 via an injector 125 at or upstream of SCR 179. Storage tank 111 may be of various forms and may include a fill neck 113 and a corresponding cap and/or cover door in the vehicle body. Fill neck 113 may be configured to receive a nozzle for replenishing the liquid reductant. Further, a temperature sensor 133 may be coupled to storage tank 111 to provide a temperature of the liquid reductant to controller 12.

Injector 125 in liquid reductant delivery line 123 injects the reductant into the exhaust upstream of SCR 179. Controller 12 may use injector 125 to control the timing and amount of reductant injections. Liquid reductant dosing system 121 may further include a pump 127. Pump 127 may be used to pressurize and deliver the liquid reductant into liquid reductant delivery line 123. A pressure sensor 131 coupled to liquid reductant delivery line 123 upstream of pump 127 and downstream of injector 125 may be included in liquid reductant dosing system 121 to provide an indication of reductant delivery pressure. Further, pump 127 may include a reverting valve 129 that, when actuated (e.g., energized), reverses a pumping direction of pump 127. For example, actuating reverting valve 129 may reverse a flow of the liquid reductant through liquid reductant delivery line 123 so that the liquid reductant flows from injector 125 to storage tank 111. Further, an $NH_3$ sensor 181 may monitor an amount of $NH_3$ stored in SCR 179. As an example, controller 12 may use feedback from $NH_3$ sensor 181 to adjust a timing and amount of the reductant injections made by injector 125 and pump 127 control.

Although FIG. 1 shows SCR 179 positioned downstream of emission control device 178, in other examples, SCR 179 is positioned upstream of emission control device 178. Thus, the relative arrangement of emission control device 178 and SCR 179 within emission control system 70 may vary. Further, liquid reductant dosing system 121 may not be included in some examples, as mentioned above. Thus, the particular configuration of emission control system 70 shown in FIG. 1 and described above is provided by way of example, and other example configurations that include both a TWC and a SCR may be used without departing from the scope of this disclosure.

External exhaust gas recirculation (EGR) may be provided to the engine via a high pressure EGR system 83. EGR system 83 delivers exhaust gas from a zone of higher pressure in exhaust passage 148, upstream of turbine 176, to a zone of lower pressure in intake manifold 146, downstream of compressor 174 and throttle 162, via an EGR passage 81. An amount EGR provided to intake manifold 146 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 146 and decrease the degree of opening of EGR valve 80 to decrease the amount of EGR provided to intake manifold 146. As an example, EGR valve 80 may be an electronically activated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve.

Under some conditions, the EGR system may be used to regulate the temperature of the air and fuel mixture within the combustion chamber. Further, EGR may be desired to attain a desired engine dilution, thereby improving fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load (as estimated via pedal position sensor 134), engine speed (as estimated via a crankshaft acceleration sensor, which will be further described below), engine temperature (as estimated via an engine coolant temperature sensor 116), etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution requirement, and further correlates the change in the dilution requirement with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to EGR valve 80 (e.g., as sent to the stepper motor or other valve actuation device) as the output.

EGR may be cooled via passing through EGR cooler 85 within EGR passage 81. EGR cooler 85 may reject heat from the EGR gases to engine coolant, for example. Although FIG. 1 shows EGR valve 80 positioned in EGR passage 81 upstream of EGR cooler 85, in other examples, EGR valve 80 may be positioned downstream of EGR cooler 85. Further, although EGR system 83 is a high pressure EGR system in the example illustrated in FIG. 1, in other examples, EGR system 83 may be a mid-pressure or a low pressure EGR system. For example, EGR system 83 may be a low pressure EGR system, wherein EGR passage 81 is coupled to exhaust passage 135 downstream of turbine 176 and is coupled to intake air passage 142 upstream of compressor 174. Thus, the configuration of EGR system 83 shown in FIG. 1 is non-limiting and provided by way of example.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of variable intake cam timing, variable exhaust cam timing, dual independent variable cam timing, or fixed cam timing may be used. When cam actuation is used, each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, such as where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at or near maximum brake torque (MBT) timing to maximize engine power and efficiency. Controller 12 may input engine operating conditions, including engine speed and engine load, into a look-up table and output the corresponding MBT timing for the input engine operating conditions, for example.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12. The fuel system will be further described below with respect to FIG. 2.

In an alternate example, fuel injector 166 may be arranged in an intake port rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder 14. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol contents, different water contents, different octane numbers, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. In still another example, fuel tanks in fuel system 8 may hold diesel fuel. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including the signals previously discussed and additionally including a measurement of inducted mass air flow (MAF) from a mass air flow sensor 122; an engine coolant temperature (ECT) from temperature sensor 116 coupled to a cooling sleeve 118; an exhaust gas temperature from a temperature sensor 158 coupled to exhaust passage 135 upstream of turbine 176; a profile ignition pickup signal (PIP) from a crankshaft position sensor 120 coupled to crankshaft 140; throttle position (TP) from the throttle position sensor; signal UEGO from exhaust gas sensor 128, which may be used by controller 12 to determine the AFR of the exhaust gas; and an absolute manifold pressure signal (MAP) from a MAP sensor 124. The manifold pressure signal MAP from MAP sensor 124 may be used to provide an indication of vacuum or pressure in the intake manifold, and controller 12 may infer an engine temperature based on the engine coolant temperature.

An engine speed signal, RPM, may be generated by controller 12 from signal PIP. For example, the crankshaft position sensor 120 (also referred to herein as a crankshaft acceleration sensor) may be a Hall effect sensor (or other type) that is positioned so that teeth on a reluctor ring attached to the crankshaft pass close to a sensor tip. The reluctor ring may have one or more teeth missing to provide the controller with a reference point to the crankshaft 140 position. As an example, the reluctor ring may include 60 teeth with two missing teeth. As crankshaft 140 rotates, crankshaft position sensor 120 may produce a pulsed voltage signal, where each pulse corresponds to a tooth on the reluctor ring.

Controller 12 receives signals from the various sensors of FIG. 1 and employs the various actuators of FIG. 1 to adjust engine operation based on the received signals and instructions stored on a memory of the controller. As will be elaborated herein with respect to FIG. 3, torque produced by each cylinder of engine 10 may be estimated by controller 12 based on input from crankshaft position sensor 120 and may be used to determine cylinder AFR imbalances. For example, controller 12 may detect an AFR imbalance in response to a sensed cylinder acceleration being lower than a mean acceleration of all of the cylinders of engine 10, resulting from the cylinder operating leaner than commanded. As another example, controller 12 may detect an AFR imbalance in response to a sensed cylinder acceleration being higher than a mean acceleration of all of the cylinders of engine 10, resulting from the cylinder operating richer than commanded. Controller 12 may adjust fueling to the imbalanced cylinder responsive to the AFR imbalance by adjusting a pulse width of signal FPW transmitted to the corresponding fuel injector 166, for example.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Continuing to FIG. 2, a schematic depiction of vehicle 5 having an engine system 208 is shown. Components described with reference to FIG. 2 that have the same identification labels as components described with reference to FIG. 1 are the same components and may not be reintroduced. Further, some components introduced in FIG. 1 are not shown in FIG. 2, although it may be understood that such components may be included in engine system 208 (e.g., EGR system 83, turbine 176, etc.).

Engine system 208 includes engine 10 having a plurality of cylinders 14 in an engine block, which includes a crankcase 230 integrated therein. Although four cylinders 14 are shown in FIG. 2, engine 10 may include any suitable number of cylinders. Engine 10 includes an intake system 223 and an exhaust system 225. Further, crankcase 230 may include a crankcase ventilation system that vents crankcase gases (e.g., entrained fuel from blow-by gases) to intake system 223, such as via a positive crankcase ventilation valve (not shown). Intake system 223 is shown including throttle 162 fluidly coupled to intake manifold 146 via intake air passage 142. Air may be routed to throttle 162 after passing through an air filter 252 coupled to intake passage 142 upstream of throttle 162. Exhaust system 225 includes exhaust manifold 148 leading to exhaust passage 135 that routes exhaust gas to the atmosphere via emission control system 70, including emission control device 178 and SCR 179.

Engine system 208 is coupled to fuel system 8 and an evaporative emissions system 219. Fuel system 8 includes a fuel tank 220 coupled to a fuel pump 234, the fuel tank supplying fuel to engine 10 that propels vehicle 5. Evaporative emissions system 219 includes a fuel vapor storage canister 222. During a fuel tank refueling event, fuel may be pumped into the vehicle from an external source through a refueling port 284. Fuel tank 220 may hold a plurality of fuel blends, including fuel with a range of alcohol concentrations, such as various gasoline-ethanol blends, including E10, E85, gasoline, etc., and combinations thereof, as further described above with respect to FIG. 1. A fuel level sensor 282 located in fuel tank 220 may provide an indication of a fuel level ("Fuel Level Input") to controller 12, which may be included in a control system 290. As depicted, fuel level sensor 282 may comprise a float connected to a variable resistor. Alternatively, other types of fuel level sensors may be used.

Fuel pump 234 is configured to deliver pressurized fuel to fuel injectors of engine 10. One or more fuel injectors may be provided for each cylinder. For example, pressurized fuel may be delivered to fuel injector 166 and the additional fuel injectors via a fuel rail 267. A fuel rail pressure sensor 268 may be coupled to fuel rail 267 to provide an indication of a pressure of fuel rail 267 to controller 12, from which an injection pressure may be determined. It will be appreciated that fuel system 8 may be a return-less fuel system, a return fuel system, or various other types of fuel system. Further, fuel system 8 may include more than one fuel pump.

Vapors generated in fuel tank 220 may be routed to fuel vapor storage canister 222 via a conduit 231 for storage before being purged to the intake system 223. Fuel vapor storage canister 222 is filled with an appropriate adsorbent 280 for temporarily trapping fuel vapors (including vaporized hydrocarbons) generated during fuel tank refueling operations, diurnal vapors, and running-loss vapors. In one example, adsorbent 280 is activated charcoal (e.g., carbon). While a single fuel vapor storage canister 222 is shown, it will be appreciated that fuel system 8 and evaporative emissions system 219 may include any number of fuel vapor storage canisters. When purging conditions are met, such as when the fuel vapor storage canister is saturated, vapors stored in fuel vapor storage canister 222 may be purged to intake system 223 via a purge line 228 by opening a canister purge valve (CPV) 212 positioned in purge line 228. In one example, canister purge valve 212 may be a solenoid valve wherein opening or closing of the valve is performed via actuation of a canister purge solenoid. As an example, CPV 212 may be a normally closed solenoid-actuated valve that is fully closed when de-energized to block (e.g., prevent) flow through purge line 228 and is at least partially open when energized to enable flow through purge line 228.

The flow of vapors along purge line 228, including a quantity and rate of vapors released, may be regulated by a duty cycle of activation of CPV 212. As such, the duty cycle of the CPV 212 solenoid may be determined by controller 12 responsive to engine operating conditions, including, for example, engine speed-load conditions, an air-fuel ratio, a fuel vapor storage canister load, etc. By commanding the canister purge valve to be closed, the controller may seal evaporative emissions system 219 from the engine intake. An optional canister check valve (not shown) may be included in purge line 228 to prevent intake manifold pressure from flowing gases in the opposite direction of the purge flow.

Fuel vapor storage canister 222 may include a buffer 222a (or buffer region), each of the fuel vapor storage canister and the buffer comprising adsorbent. For example, buffer 222a is shown packed with an adsorbent 280a. As shown, the volume of buffer 222a may be smaller than (e.g., a fraction of) the volume of fuel vapor storage canister 222. Adsorbent 280a in the buffer 222a may be the same as or different from adsorbent 280 in the fuel vapor storage canister (e.g., both may include charcoal). Buffer 222a may be positioned within fuel vapor storage canister 222 such that during fuel vapor storage canister loading, fuel tank vapors are first adsorbed within the buffer, and then when the buffer is saturated, further fuel tank vapors are adsorbed in the fuel vapor storage canister. In comparison, during fuel vapor storage canister purging, fuel vapors are first desorbed from the fuel vapor storage canister (e.g., to a threshold amount) before being desorbed from the buffer. In other words, loading and unloading of the buffer is not linear with the loading and unloading of the fuel vapor storage canister. As such, the effect of the fuel vapor storage canister buffer is to dampen any fuel vapor spikes flowing from the fuel tank to the fuel vapor storage canister, thereby reducing the possibility of any fuel vapor spikes going to the engine.

Fuel vapor storage canister 222 includes a vent 227 for routing gases out of the fuel vapor storage canister 222 to the atmosphere when storing fuel vapors from fuel tank 220. Vent 227 may also allow fresh air to be drawn into fuel vapor storage canister 222 when purging stored fuel vapors to engine intake 223 via purge line 228 and canister purge valve 212. While this example shows vent 227 communicating with fresh, unheated air, various modifications may also be used. Vent 227 may include a canister vent valve (CVV) 214 to adjust a flow of air and vapors between fuel vapor storage canister 222 and the atmosphere. When included, CVV 214 may be a normally open valve so that air, stripped of fuel vapor after having passed through the fuel vapor storage canister, can be pushed out to the atmosphere (for example, during refueling while the engine is off). Likewise, during purging operations (for example, during fuel vapor storage canister regeneration and while the engine is running), the fuel vapor storage canister vent valve may be opened to allow a flow of fresh air to strip the fuel vapors stored in the fuel vapor storage canister. In one example, canister vent valve 214 may be a solenoid valve, wherein opening or closing of the valve is performed via actuation of a canister vent solenoid. In particular, CVV 214 may be a normally open solenoid-activated valve that is (e.g., fully) open when de-energized, allowing gas to flow between the atmosphere and evaporative emissions system 219 via vent 227, and fully closed when energized to block gas flow through vent 227.

Evaporative emissions system 219 may further include a bleed fuel vapor storage canister 211. Hydrocarbons that desorb from fuel vapor storage canister 222 (hereinafter also referred to as the "main fuel vapor storage canister") may be adsorbed within the bleed fuel vapor storage canister. Bleed fuel vapor storage canister 211 may include an adsorbent material 280b that is different than the adsorbent material included in main fuel vapor storage canister 222. Alternatively, the adsorbent material 280b in bleed fuel vapor storage canister 211 may be the same as that included in main fuel vapor storage canister 222.

A hydrocarbon (HC) sensor 213 may be present in evaporative emissions system 219 to indicate the concentration of hydrocarbons in vent 227. As illustrated, hydrocarbon sensor 213 is positioned between main fuel vapor storage canister 222 and bleed fuel vapor storage canister 211. A probe (e.g., sensing element) of hydrocarbon sensor 213 is exposed to and senses the hydrocarbon concentration of gas flow in vent 227. Hydrocarbon sensor 213 may be used by control system 290 for determining breakthrough of hydrocarbon vapors from main fuel vapor storage canister 222, in one example.

One or more temperature sensors 215 may be coupled to and/or within fuel vapor storage canister 222. As fuel vapor is adsorbed by the adsorbent in the fuel vapor storage canister, heat is generated (heat of adsorption) Likewise, as fuel vapor is desorbed by the adsorbent in the fuel vapor storage canister, heat is consumed. In this way, the adsorption and desorption of fuel vapor by the fuel vapor storage canister may be monitored and estimated based on temperature changes within the fuel vapor storage canister. Further, one or more canister heating elements 216 may be coupled to and/or within fuel vapor storage canister 222. Canister heating element 216 may be used to selectively heat the fuel vapor storage canister (and the adsorbent contained within) for example, to increase desorption of fuel vapors prior to performing a purge operation. Canister heating element 216 may comprise an electric heating element, such as a conductive metal, ceramic, or carbon element that may be heated electrically. In some embodiments, canister heating element 216 may comprise a source of microwave energy or may comprise a fuel vapor storage canister jacket coupled to a source of hot air or hot water. Canister heating element 216 may be coupled to one or more heat exchangers that may facilitate the transfer of heat, (e.g., from hot exhaust) to fuel vapor storage canister 222. Canister heating element 216 may be configured to heat air within fuel vapor storage canister 222 and/or to directly heat the adsorbent located within fuel vapor storage canister 222. In some embodiments, canister heating element 216 may be included in a heater compartment coupled to the interior or exterior of fuel vapor storage canister 222. In some embodiments, fuel vapor storage canister 222 may be coupled to one or more cooling circuits and/or cooling fans. In this way, fuel vapor storage canister 222 may be selectively cooled to increase adsorption of fuel vapors (e.g., prior to a refueling event). In some examples, canister heating element 216 may comprise one or more Peltier elements, which may be configured to selectively heat or cool fuel vapor storage canister 222.

In some examples, a fuel tank isolation valve (FTIV) 236 may be optionally included in conduit 231 such that fuel tank 220 is coupled to fuel vapor storage canister 222 via the valve. During regular engine operation, FTIV 236 may be kept closed to limit the amount of diurnal or "running loss" vapors directed to fuel vapor storage canister 222 from fuel tank 220. During refueling operations and selected purging conditions, FTIV 236 may be temporarily opened, e.g., for a duration, to direct fuel vapors from fuel tank 220 to fuel vapor storage canister 222. By opening the valve during purging conditions or when the fuel tank pressure is higher than a threshold (e.g., above a mechanical pressure limit of the fuel tank), the refueling vapors may be released into the fuel vapor storage canister and the fuel tank pressure may be maintained below pressure limits. While the depicted example shows FTIV 236 positioned along conduit 231, in alternative examples, FTIV 236 may be mounted on fuel tank 220.

One or more pressure sensors may be coupled to fuel system 8 and evaporative emissions system 219 for providing an estimate of a fuel system and an evaporative emissions system pressure, respectively. In the example illustrated in FIG. 2, a first pressure sensor 217 is coupled directly to fuel tank 220, and a second pressure sensor 238 is coupled to conduit 231 between FTIV 236 and fuel vapor storage canister 222. For example, first pressure sensor 217 may be a fuel tank pressure transducer (FTPT) coupled to fuel tank 220 for measuring a pressure of fuel system 8, and second pressure sensor 238 may measure a pressure of evaporative emissions system 219. In alternative examples, first pressure sensor 217 may be coupled between fuel tank 220 and fuel vapor storage canister 222, specifically between the fuel tank and FTIV 236. In still other examples, a single pressure sensor may be included for measuring both the fuel system pressure and the evaporative system pressure, such as when FTIV 236 is open or omitted.

One or more temperature sensors 221 may also be coupled to fuel system 8 for providing an estimate of a fuel system temperature. In one example, the fuel system temperature is a fuel tank temperature, wherein temperature sensor 221 is a fuel tank temperature sensor coupled to fuel tank 220. While the depicted example shows temperature sensor 221 directly coupled to fuel tank 220, in other examples, the temperature sensor may be coupled between the fuel tank and fuel vapor storage canister 222.

Vehicle 5 may further include control system 290. Control system 290 is shown receiving information from a plurality of sensors 16 (various examples of which are described herein) and sending control signals to a plurality of actuators 81 (various examples of which are described herein). As one example, sensors 16 may include exhaust gas sensor 128, temperature sensor 158, MAP sensor 124, FTPT 217, second pressure sensor 238, hydrocarbon sensor 213, temperature sensor 221, and a pressure sensor 229 located downstream of emission control system 70. Other sensors, such as additional pressure, temperature, air/fuel ratio, and composition sensors, may be coupled to various locations in the vehicle 5. As another example, actuators 81 may include fuel injector 166, FTIV 236, purge valve 212, vent valve 214, fuel pump 234, and throttle 162.

Together, the systems of FIGS. 1 and 2 provide a multi-cylinder engine system that may include both an EGR system for recirculating a portion of exhaust gas and an evaporative emissions system for storing and then purging fuel vapors. As one example, a controller (e.g., controller 12 of FIGS. 1-2) may adjust engine fueling based on engine air flow, EGR rate, purge flow rate, etc. in order to achieve a desired (e.g., commanded) AFR (e.g., stoichiometry). As mentioned above, a three-way catalyst (e.g., included in emission control device 178 of FIGS. 1-2) may be most efficient when the engine operates at stoichiometry, and therefore, the commanded AFR may be kept at or near stoichiometry during most operating conditions. Further, systems that include an SCR may convert NOx more efficiently during lean conditions relative to systems without an SCR. Thus, systems with an SCR may operate lean without increasing emissions relative to stoichiometric operation.

However, variations in the size and shape of air passages, variability in fuel injector flow from cylinder to cylinder, differences in EGR distribution across cylinders, and differences in purge flow distribution across cylinders may cause the AFR to vary across cylinders. As an illustrative example, a first cylinder may receive more air flow than a second cylinder, and so the first cylinder may have a leaner AFR than the second cylinder even when both cylinders are commanded to operate at a same AFR. Thus, an AFR imbalance may be present between the first cylinder and the second cylinder.

When the AFR imbalance exceeds a threshold, the emission control device may no longer operate at stoichiometry, resulting in an increase in vehicle emissions. Further, the AFR imbalance may result in torque disturbances, for example, due to different burn rates of rich mixtures, lean mixtures, and stoichiometric mixtures. Further, global closed-loop fuel control of the engine (or engine bank) via feedback from an exhaust gas sensor (e.g., exhaust gas sensor 128 of FIGS. 1-2) may not identify cylinder-to-cylinder AFR imbalances, as the exhaust gas sensor may be positioned to measure a mixture of exhaust gas from all of the cylinders of the engine (or the engine bank). Further, even when cylinder imbalance is detected, it may be difficult to identify a source of the imbalance if more than one potential imbalance source (such as EGR, unmetered fuel due to purge or crankcase gases, fuel injector offsets, air maldistribution, etc.) is present, making any corrections to the cylinder imbalance inaccurate across different operating conditions.

Figure 3:
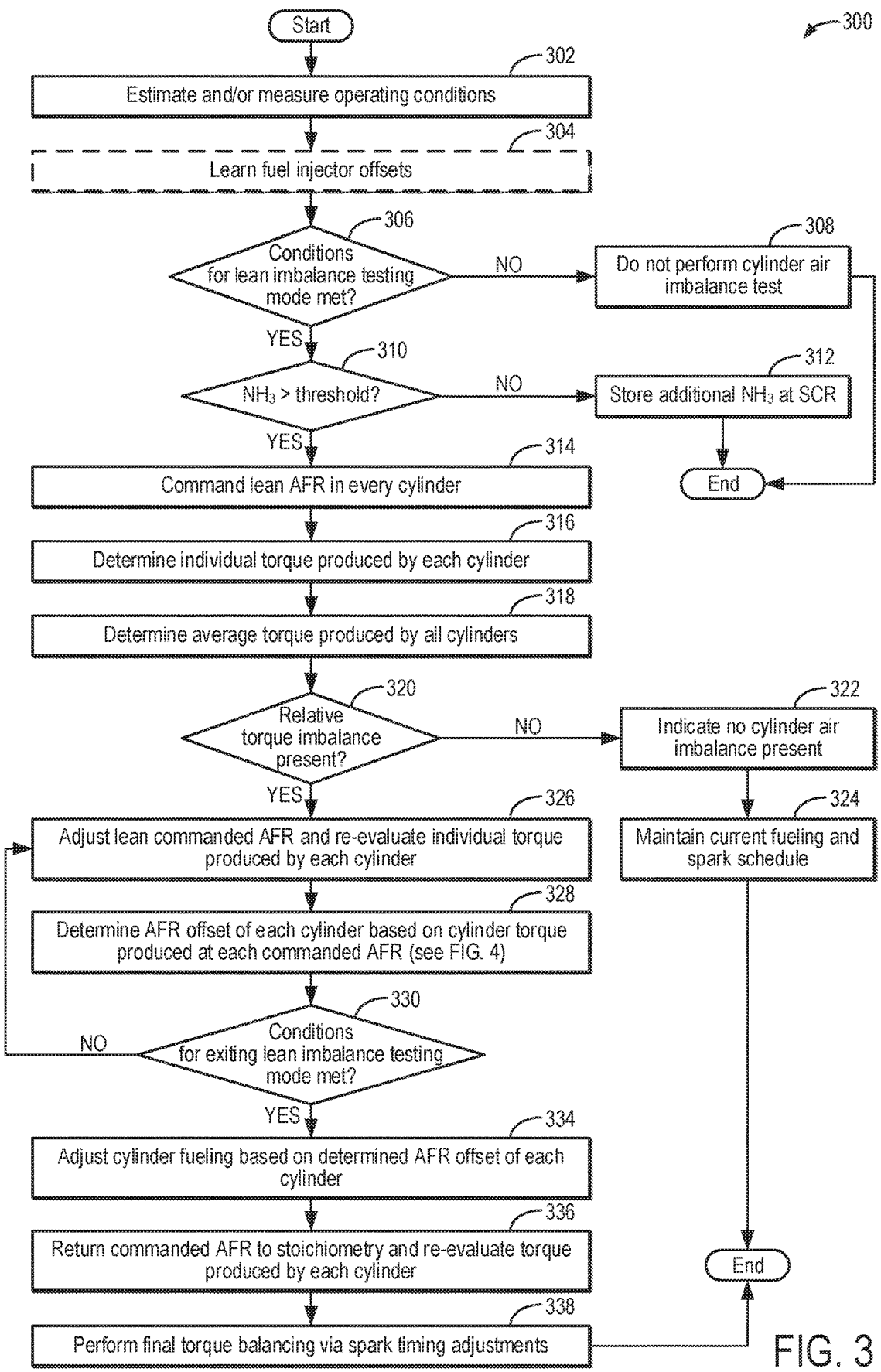
FIG. 3 shows an example method for identifying and correcting cylinder-to-cylinder air-fuel ratio imbalances that are caused by air imbalance between cylinders.

Therefore, FIG. 3 provides a flowchart of a method 300 for operating an engine (e.g., engine 10 shown in FIGS. 1 and 2) to identify and correct cylinder AFR imbalances caused by air distribution differences between cylinders (referred to herein as a cylinder air imbalance). In particular, method 300 may utilize lean engine operation (referred to as a "lean imbalance testing mode" herein) to identify the air imbalances, with the inclusion of an SCR in the engine system (e.g., SCR 179 of FIGS. 1 and 2) preventing and/or reducing increased NOx emissions during the lean imbalance testing. Further, responsive to a detected cylinder imbalance, engine operation may be adjusted to compensate for the air distribution differences in order to balance engine torque across all of the cylinders of the engine. Thus, method 300 may provide both an AFR imbalance monitor and an AFR imbalance correction. Instructions for carrying out method 300 and the rest of the methods included herein may be executed by a controller (e.g., controller 12 of FIGS. 1-2) based on instructions stored on a memory of the controller and in conjunction with signals received from sensors of the engine, such as the sensors described above with reference to FIGS. 1-2 (e.g., crankshaft position sensor 120 of FIG. 1 and $NH_3$ sensor 181 of FIGS. 1 and 2). The controller may employ engine actuators of the engine system to adjust engine operation according to the methods described below.

At 302, method 300 includes estimating and/or measuring operating conditions. The vehicle operating conditions may include both vehicle and engine operating conditions. The operating conditions may include, for example, engine temperature, engine speed, engine load, vehicle speed, a stored $NH_3$ amount at the SCR, an exhaust temperature, a commanded AFR, a measured AFR, an accelerator pedal position (e.g., torque demand), spark timing, an EGR flow rate, a purge flow rate, etc. As one example, the exhaust temperature may be determined based on a temperature measured by an exhaust gas temperature sensor (e.g., sensor 158 of FIGS. 1 and 2). As another example, the engine temperature may be determined based on an engine coolant temperature measured by an engine coolant temperature sensor (e.g., temperature sensor 116 of FIG. 1). The stored amount of $NH_3$ may be measured by an $NH_3$ sensor, for example. As another example, the EGR flow rate may be zero when EGR is not provided (e.g., an EGR valve, such as EGR valve 80 shown in FIG. 1, is fully closed). Conversely, the EGR flow rate may be non-zero when EGR is provided (e.g., the EGR valve is at least partially open). Similarly, the purge flow rate may be zero when purge is not provided (e.g., a purge valve, such as CPV 212 shown in FIG. 2, is fully closed). Likewise, the purge flow rate may be non-zero when purge is provided (e.g., the purge valve is at least partially open).

At 304, method 300 optionally includes learning fuel injector offsets. Each fuel injector, such as fuel injector 166 in FIG. 1, may experience some delay between a commanded injection time and an actual injection time due to factors such as fuel rail pressure and an amount of time it takes the fuel injector to open, for example, which may vary from fuel injector to fuel injector. In some examples, fuel injector offsets may be learned through pressure-based injector balancing (PBIB). In one example, the PBIB may include comparing pressure sensor readings from a fuel rail pressure sensor (e.g., fuel rail pressure sensor 268 shown in FIG. 2) before and after actuation of each individual fuel injector. Thus, PBIB includes measuring a pressure drop due to an injection in order to balance a fuel quantity injected between fuel injectors. As another example, additionally or alternatively, fuel injector offsets may be learned by monitoring an electrical current signature of each injector over a plurality of engine cycles. For example, an amount of time between an injection open command being sent and the electrical current signature on the injector indicating that an armature of the injector is initially moving (e.g., pintle lift) may be measured for each injector, called an opening delay. Thus, differences in the opening delay between fuel injectors can be measured and compensated. In some examples, this injector current signature monitoring is extended to also characterize injector off time, and a similar compensation is applied.

As one example, the fuel injector offsets may not be learned, and 304 may be omitted, when the fuel injector offsets have already been learned within a threshold duration. The threshold duration may be a pre-calibrated time duration over which the fuel injector offsets are not expected to change. Conversely, the fuel injector offsets may be learned, and 304 may be included, when the fuel injector offsets are not known or when at least the threshold duration has elapsed since the fuel injector offsets were determined. By first learning the offset for each fuel injector, variations may be compensated for. As such, it may be assumed that fuel metering is not the source of any subsequent torque imbalance detected between cylinders.

At 306, method 300 includes determining whether the conditions for entering the lean imbalance testing mode are met. As one example, the conditions for entering the lean imbalance testing mode may include the exhaust temperature being greater than a first threshold temperature. In one example, the first threshold temperature may be a non-zero, pre-determined temperature below which the SCR may operate inefficiently. The conditions for entering the lean imbalance testing mode may further include the exhaust temperature being less than a second threshold temperature, greater than the first threshold temperature. In one example, the second threshold temperature may be a non-zero, pre-determined temperature above which an additional temperature increase (e.g., due to enleanment) may degrade one or more exhaust components, including one or more of a turbocharger turbine, the SCR, a three-way catalyst, etc. The conditions for entering the lean imbalance testing mode may further include the engine temperature being greater than a third threshold temperature. In one example, the third threshold temperature may refer to a temperature at which entrained fuel is released from a crankcase of the engine (e.g., crankcase 230 of FIG. 2), reducing or eliminating an effect of crankcase fuel vapors on the cylinder imbalance test. The conditions for entering the lean imbalance testing mode may further include both EGR and purge not being provided (e.g., the EGR valve and the CPV are both fully closed). All of the conditions for entering the lean imbalance testing mode may be confirmed for the conditions to be considered met.

If conditions for entering the lean imbalance testing mode are not met (e.g., one or more of the conditions is not met), method 300 proceeds to 308 and includes not performing the cylinder air imbalance test. For example, without all of the conditions met, emissions degradation may occur, exhaust component degradation may occur, and/or a performed imbalance test may produce inaccurate results. Therefore, the engine may not enter the lean imbalance testing mode, and method 300 may end. As one example, method 300 may be repeated after a waiting period to determine whether the operating conditions have changed to enable the cylinder air imbalance test to be performed. In one example, the exhaust temperature may be too cold during start-up, and method 300 may be repeated after the exhaust temperature increases so that the SCR may convert NOx effectively.

If instead the conditions for entering the lean imbalance testing mode are met, method 300 proceeds to 310 and includes determining if the stored amount of $NH_3$ (e.g., as measured at 302) exceeds a first threshold value. In some examples, the first threshold value for the stored amount of $NH_3$ may be a non-zero, pre-determined value stored in controller memory that corresponds to a sufficient amount of stored $NH_3$ for prolonged lean engine operation (e.g., lean operation that lasts from 1-15 minutes). For example, the first threshold value may be selected to maintain the stored amount of $NH_3$ above a second threshold value, which is less than the first threshold value, over an entirety of the operation in the lean imbalance testing mode. As an example, the second threshold value may correspond to a minimum amount of stored ammonia for effectively reducing NOx by the SCR while operating the engine lean and will be further described below at 330. In some examples, additionally or alternatively, the first threshold value may be calibrated based on current engine operating conditions, such as the engine load, the engine speed, and the exhaust gas temperature. In this way, the first threshold value may be adjusted in order to increase an efficiency of NOx reduction by the SCR during a variety of lean engine operating conditions.

If the amount of stored $NH_3$ does not exceed the threshold value, method 300 continues to 312, and includes storing additional $NH_3$ at the SCR. As one example, the engine may be operated rich (e.g., at a rich commanded AFR) to generate $NH_3$ over the three-way catalyst and a lean NOx trap positioned upstream of the SCR. The generated $NH_3$ may flow downstream to the SCR, where it may be stored. As another example, additionally or alternatively, the controller may actuate a pump and an injector included in a liquid reductant dosing system (e.g., pump 127 and injector 125 of liquid reductant dosing system 121 shown in FIG. 1) to deliver more $NH_3$ to the SCR. Method 300 may then end. As one example, method 300 may be repeated, such as after a waiting period or responsive to the amount of stored $NH_3$ reaching the threshold value, to determine whether the engine is prepared to enter the lean imbalance testing mode.

If the stored $NH_3$ does exceed the threshold value, method 300 proceeds to 314 and includes commanding a lean AFR in every cylinder. As an example, a desired lean AFR to command for all of the cylinders may be a pre-determined value stored in controller memory that is a base (or starting) value for cylinder air imbalance testing in the lean imbalance testing mode. In other examples, the controller may determine the desired lean AFR to command based on engine operating conditions, including engine speed, engine load, and torque demand. For example, the controller may input the engine operating conditions (e.g., the engine speed, the engine load, and the torque demand) into one or more look-up tables, maps, or functions, which may output the corresponding desired lean AFR to command for the input conditions. As another example, the controller may determine the desired lean AFR to command using logic rules that are a function of the engine speed, the engine load, and the torque demand. In order to command operation of each cylinder at the desired lean AFR, the controller may adjust a pulse width of a signal FPW sent to the fuel injector of each cylinder based on the desired lean AFR and a cylinder air charge amount, such as via one or more look-up tables or one or more functions. In one example, the enleanment may be gradually increased over a plurality of engine cycles. For example, the AFR may be incrementally increased cycle-by-cycle until the desired lean AFR is reached. In another example, the cylinders may be stepped to the desired lean AFR over one engine cycle. Thus, the engine may be transitioned into the lean imbalance testing mode, defined by global enleanment across all engine cylinders and with every cylinder commanded to operate at the same desired lean AFR. Because global enleanment results in increased NOx production and a three-way catalyst is inefficient at NOx reduction during lean conditions, the incorporation of the SCR mitigates the increased NOx production and the reduced three-way catalyst efficiency.

At 316, method 300 includes determining an individual torque produced by each cylinder. In one example, a crankshaft acceleration for each individual cylinder may be determined using output from a crankshaft position sensor (e.g., crankshaft position sensor 120). In one example, the controller may determine the crankshaft acceleration produced by each individual cylinder based on a change of crankshaft position over time during that cylinder's firing event. The individual crankshaft acceleration determined for each cylinder may be used to calculate the individual torque produced by each cylinder using known relationships between acceleration and torque. In other examples, a crankshaft acceleration sensor may be used to determine the individual torque produced by each cylinder, such as by directly measuring the acceleration produced during each cylinder's firing event and then relating the measured acceleration to torque, as described above. As still another example, the torque produced during each cylinder's firing event may be directly measured by a crankshaft torque sensor. In some examples, the individual cylinder torques produced by each cylinder may not be determined if transient engine conditions, such as tip-ins and tip-outs, are detected (e.g., based on the accelerator pedal position).

At 318, method 300 includes determining an average (e.g., mean) torque produced by all cylinders of the engine. For example, the average torque may be determined by summing together the individual cylinder torques over one engine cycle and dividing the sum by the number of cylinders. This enables each individual cylinder torque to be compared to the average cylinder torque. As such, any detected torque imbalances between cylinders (as will be described below) may be referred to as a relative torque imbalance (e.g., the torque produced by a cylinder is imbalanced relative to the average cylinder torque) and is not an absolute torque imbalance (e.g., the torque produced by the cylinder is more or less than commanded).

At 320, method 300 includes determining if a relative torque imbalance is present. For example, the controller may compare each individual cylinder torque to the mean value to determine if any individual cylinder torque deviates from the mean by an amount greater than a threshold deviation. The first threshold deviation may be a pre-determined, non-zero value stored in controller memory, for example. In another example, the first threshold deviation may be expressed as a percentage of the mean torque, such as a percentage within a range from 0.2-2%. Therefore, the relative torque imbalance may be present when one or more cylinders torques deviates from the mean by at least the first threshold deviation (e.g., is higher than the average torque by at least the first threshold deviation or is lower than the average torque by at least the first threshold deviation). Conversely, the relative torque imbalance may not be present when all of the cylinder torques are within (e.g., less than) the first threshold deviation from the mean torque.

If no imbalance is detected (e.g., all cylinders produce torque within the threshold deviation of the mean torque), method 300 proceeds to 322, which includes indicating that no cylinder air imbalance is present. In one example, this result may be stored in controller memory, such that the diagnostic result may be accessed at a future time. As another example, the controller may schedule a subsequent air imbalance test for a predetermined duration (e.g., weeks or months) later.

At 324, method 300 includes maintaining the current fueling and spark schedule. Because the engine cylinders are already producing balanced torque outputs, fuel injection and spark timing compensations are not indicated for further balancing. Following 324, method 300 ends.

If a relative torque imbalance is detected at 320, method 300 proceeds to 326 and includes adjusting the lean commanded AFR and re-evaluating the individual torque produced by each cylinder. In one example, the commanded AFR may be further enleaned. As another example, a degree of enleanment of the commanded AFR may be decreased while remaining lean relative to stoichiometry. As one example, the controller may adjust the lean commanded AFR by a pre-determined amount stored in a memory of the controller. As another example, the controller may determine the adjusted lean commanded AFR based on operating conditions, such as by inputting the operating conditions (such as engine speed, engine load, and torque demand, for example) as well as the previously commanded lean AFR into one or more look-up tables, algorithms, or maps stored in memory, which may output the adjusted lean commanded AFR for the input conditions. Once the fuel injection amount for each cylinder is adjusted according to the adjusted lean commanded AFR (e.g., as described above at 314), the individual torque produced by each cylinder may again be determined, as described above at 316. As will be elaborated below at 330, method 300 may include multiple rounds of adjusting the lean commanded AFR and determining the corresponding individual cylinder torque at the currently commanded lean AFR, at least in some examples.

At 328, method 300 includes determining an AFR offset of each cylinder based on the cylinder torque produced at each lean commanded AFR. As one example, the controller may determine an observed AFR of each cylinder at the current lean commanded AFR based on a change in cylinder torque between operating at the previous lean commanded AFR and the current lean commanded AFR and a difference between the previous lean commanded AFR and the current lean commanded AFR. The observed AFR refers to an operating AFR of the cylinder, which may be different than the current commanded lean AFR (e.g., due to air maldistribution), that is estimated based on a known relationship between AFR and torque. For example, the controller may refer to a plot or look-up table that maps torque values to AFR in order to determine the observed AFR for each lean commanded AFR in the dataset for each cylinder. The controller may consult the mapping to determine where on the torque-lambda curve the cylinder is operating (e.g., how different the resulting distances between data points on the torque-lambda curve are from the expected distances between data points).

Figure 4:
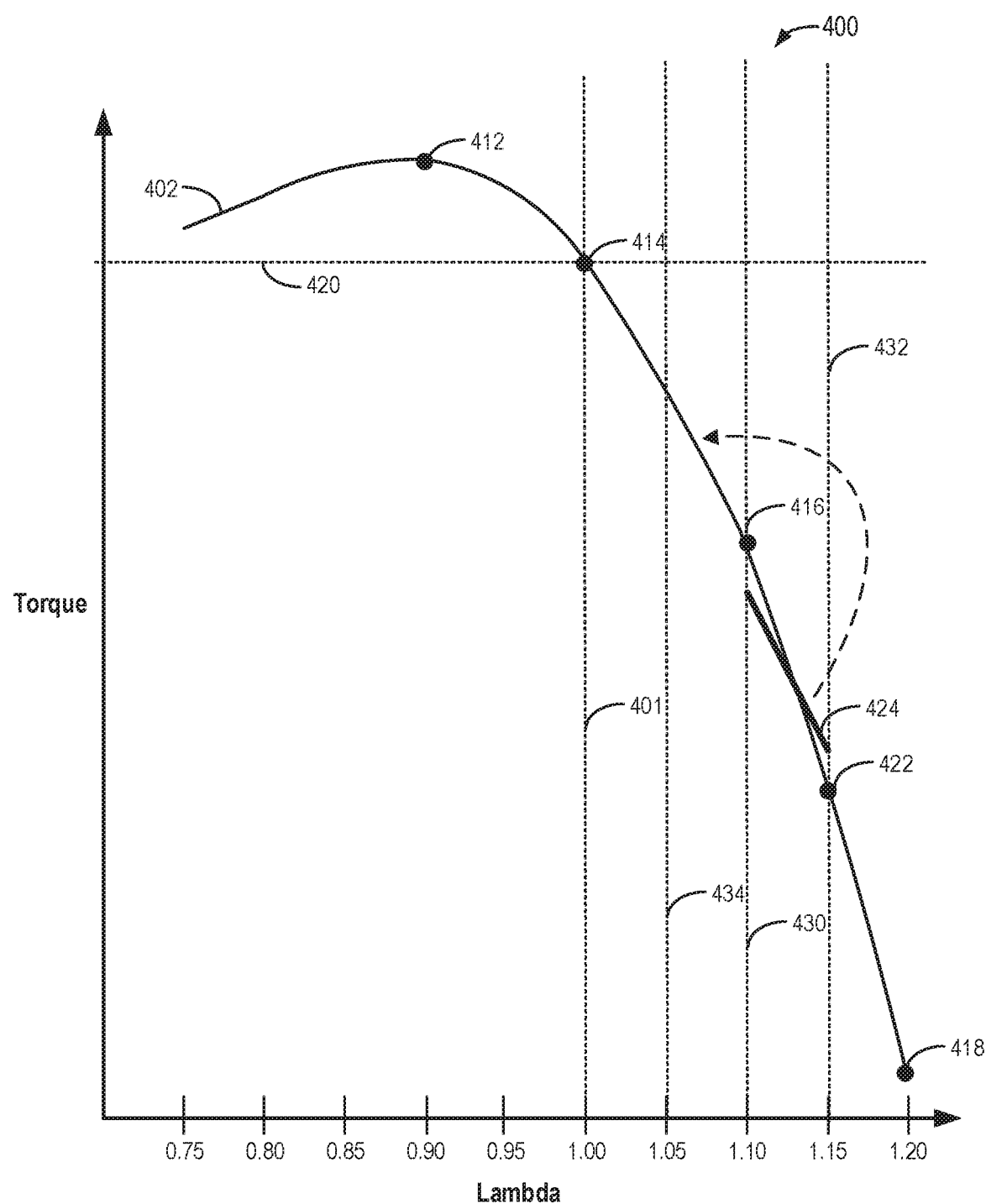
FIG. 4 shows an example relationship between engine torque and engine air-fuel ratio.
Figure 5:
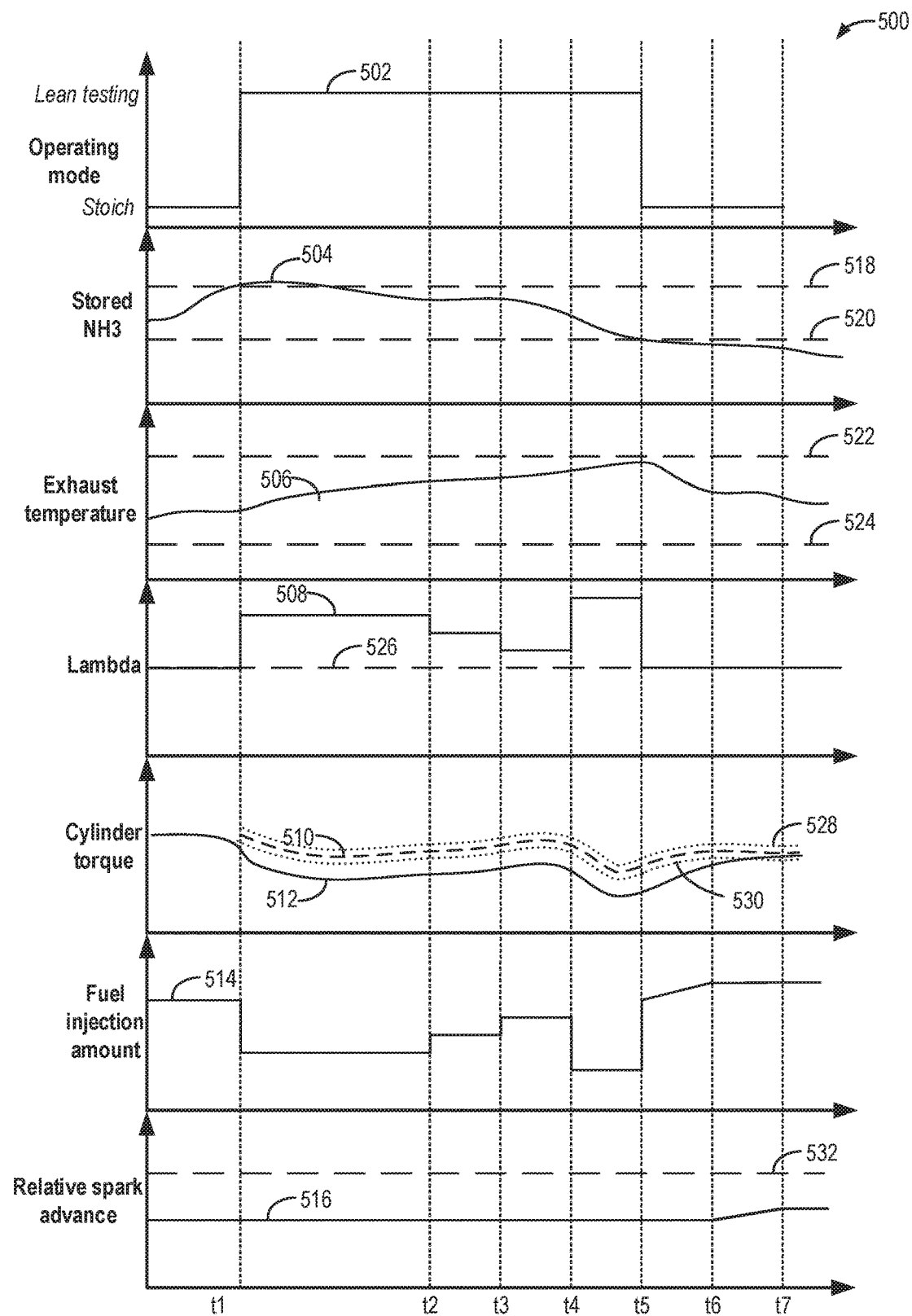
FIG. 5 shows an example timeline for identifying a cylinder air imbalance and correcting for the imbalance.

Turning briefly to FIG. 4, a plot 400 of an illustrative, non-limiting example relationship between relative torque and lambda (e.g., relative AFR) in a cylinder of a spark ignition engine is shown. The engine may be engine 10 shown in FIGS. 1-2, for example. For plot 400, the vertical axis shows cylinder torque. The horizontal axis shows lambda ($\lambda$), with lambda values less than one ($\lambda<1$) representing rich AFRs, and lambda values greater than one ($\lambda>1$) representing lean AFRs. Plot 400 further includes a dashed line 401 positioned at stoichiometry. For example, points to the left of dashed line 401 have a lambda value less than one (e.g., a rich AFR), while points to the right of dashed line 401 have a lambda value greater than one (e.g., a lean AFR). A dashed line 420 denotes the torque output at stoichiometric operation.

Plot 400 includes a non-linear curve 402 that relates a lambda value of a cylinder to a corresponding torque output of the cylinder. For example, stoichiometric operation is shown at a point 414. At a point 412, curve 402 shows that operating the cylinder with a rich lambda value of 0.90 produces a torque output that is greater than the stoichiometric torque output (e.g., greater than dashed line 420). At a point 416, curve 402 shows that operating the cylinder a lean lambda value of 1.10 produces a torque output that is less than the stoichiometric torque output (e.g., less than dashed line 420). At a point 418, curve 402 shows that operating the cylinder at a lean lambda value of 1.20 produces a torque output that is less than the torque output at point 416. Further, a rate of decrease in the torque output between point 414 and point 416 (e.g., between the torque output at $\lambda=1$ and the torque output at $\lambda=1.10$) is steeper than a rate of increase in torque output between point 414 and point 412 (e.g., between the torque output at $\lambda=1$ and $\lambda=0.90$). Further still, a rate of decrease in the torque output between 416 and 418 (e.g., between the torque output at $\lambda=1.10$ and the torque output at $\lambda=1.20$) is greater than the rate of decrease in the torque output between point 414 and point 416 (e.g., between the torque output at λ=1 and the torque output at λ=1.10), even though the difference between the lambda values is the same. As such, a difference between torque outputs for at least two commanded AFRs may provide information regarding an AFR offset for each cylinder.

In one illustrative, non-limiting example, a cylinder may produce a first torque output while commanded to operate at a first lean AFR of λ=1.10 (dashed line 430) and a second torque output while commanded to operate at a second lean AFR of λ=1.15 (dashed line 432), resulting in a torque-AFR slope represented by a line 424. The torque-AFR slope is a ratio of a change in torque (e.g., a difference between the first torque output and the second torque output) and a change in lambda (e.g., a difference between the first lean AFR and the second lean AFR). However, the rate of change of line 424 (e.g., the ratio of the change in torque to the change in lambda) is slower than the rate of change of curve 402 between lambda values of 1.10 and 1.15. However, the torque-AFR slope of line 424 is similar to the rate of change of curve 402 between λ=1.05 (dashed line 434) and λ=1.10 (dashed line 430), an interval with the same change in lambda. Thus, the cylinder may be said to be operating on this portion of curve 402, such that the operating lambda value (e.g., relative AFR) for the cylinder is offset from the commanded lambda value by 0.05. This offset may be referred to as a lambda offset or an AFR offset.

Returning to FIG. 3, for each cylinder, the controller may input a difference between a first torque output for a first lean commanded AFR, a second torque output for a second lean commanded AFR, and a difference between the first commanded AFR and the second commanded AFR into the plot or look-up table, such as plot 400 of FIG. 4, which may output a first operating AFR and a second operating AFR for the given cylinder based on the input differences. The controller may determine an AFR offset for each cylinder based on a difference between the first operating AFR and the first lean commanded AFR and a difference between the second operating AFR and the second lean commanded AFR. For example, a relationship between enleanment and reduced cylinder acceleration is near 1, meaning that an additional 1% enleanment results in an approximate 1% reduction in that cylinder's resultant acceleration (and thus torque output). In this way, the change in the torque output between two commanded AFRs may be used to determine an actual change in the AFR, and thus the AFR offset.

As one example, the controller may continue this comparison for consecutive lean commanded AFRs (e.g., comparing data for the second lean commanded AFR with data for a third commanded AFR, comparing data for the third commanded AFR with data for a fourth commanded AFR, etc.). In some examples, the controller may average AFR offset values determined for one cylinder using multiple data points in order to determine the AFR offset of the cylinder. In other examples, the controller may select one of the AFR offset values determined for the cylinder based on a statistical analysis of the AFR offset values.

At 330, method 300 includes determining whether conditions for exiting the lean imbalance testing mode are met. As one example, the conditions for exiting the lean imbalance testing mode may include a threshold number of samples having been obtained while operating in the lean imbalance testing mode. Each sample may include a determination of individual cylinder torque production for a given commanded lean AFR. For example, the threshold number may be a pre-determined, non-zero number set in controller memory that refers to an adequate number of samples for accurately evaluating each cylinder's AFR offset. As another example, the controller may perform a statistical analysis of the AFR offsets calculated for each cylinder, such as calculating the standard deviation, and may determine that the conditions for exiting the lean imbalance testing mode are met when the statistical analysis meets pre-defined criteria for increasing the accuracy of the final AFR offset determined for each cylinder. As yet another example, the conditions for exiting the lean imbalance testing mode may additionally include the stored $NH_3$ amount decreasing below a pre-determined, non-zero second threshold value, which is lower than the first threshold value described above at 310. For example, if the stored amount of $NH_3$ has decreased below the second threshold value, the SCR may not efficiently convert NOx emissions in the exhaust stream due to the global enleanment.

If the conditions for exiting the lean imbalance testing mode are not met, such as when neither of the conditions for exiting the lean imbalance testing mode are met, method 300 may return to 326 so that another sample may be obtained, using a different lean AFR value for each iteration. For example, each time method 300 returns to 326, the commanded lean AFR may be further adjusted and the individual torque produced by each cylinder re-evaluated. This may be repeated until the conditions for exiting the lean imbalance testing mode are met.

Responsive to at least one of the conditions for exiting the lean imbalance mode being met, such as the threshold number of samples being obtained or the $NH_3$ amount decreasing below the second threshold value, method 300 proceeds to 334 and includes adjusting cylinder fueling based on the AFR offset of each cylinder (e.g., determined at 328). Because air distribution differences may not be directly adjusted, the controller may compensate for cylinder air imbalances and the resulting AFR offsets by adjusting the cylinder fueling instead. For example, the controller may use the AFR offset value determined for each cylinder to determine a fuel correction term that is expected to bring the current observed AFR to the current commanded AFR. In one example, the controller may adjust the pulse width of the signal FPW sent to the fuel injector of each cylinder based on the AFR offset of the particular cylinder and a cylinder air charge amount, such as via one or more look-up tables or logic rules stored in controller memory. In some examples, the controller may continue to adjust the cylinder fueling until the AFR offset is equal to zero, and the current operating AFR is brought to the current commanded AFR. Thus, even if a cylinder was not determined to be imbalanced from the other cylinders at 320, an accuracy of the cylinder fueling may be increased.

At 336, method 300 includes returning the commanded AFR to stoichiometry and re-evaluating the torque produced by each cylinder. For example, the individual torque produced by each cylinder may be determined (e.g., as described above at 316) and compared to the average torque produced by all of the cylinders (e.g., as described above at 318) to determine any cylinder torque deviations from the average.

At 338, method 300 includes performing final torque balancing via spark timing adjustments. The torque may be considered balanced when the torque output by each cylinder is within a pre-defined, non-zero second threshold deviation from the mean torque, which may be a difference or percentage difference that is less than the first threshold deviation described above at 320 (e.g., 0.1 to 1% of the mean). Further, the spark timing may be individually adjusted for each cylinder. Adjusting the spark timing may include advancing or retarding the spark timing relative to a currently scheduled timing. This may include, for example, retarding the spark timing of the cylinder (e.g., further retarding from MBT timing to decrease torque) when the individual torque of the cylinder is at least the second threshold deviation more than the mean torque and advancing the spark timing of the cylinder (e.g., further advancing toward MBT timing to increase torque) when the individual torque of the cylinder is at least the second threshold deviation less than the mean torque. In one example, the controller may adjust the spark timing in proportion to the difference between the torque produced by the imbalanced cylinder and the mean torque. In another example, the controller may input the difference between the torque produced by the imbalanced cylinder and the mean torque into a look-up table, algorithm, or map, which may output a corresponding adjustment to the spark timing. In still another example, the controller may make a logical determination (e.g., regarding the adjustment to the spark timing) based on logic rules that are a function of the difference. Further, the controller may generate a control signal that is sent the ignition system to actuate the spark plug of each cylinder at the determined spark timing for that individual cylinder. Following 338, method 300 ends.

In this way, air imbalances between cylinders that may result in cylinder-to-cylinder AFR imbalances may be identified and compensated for. By adding the SCR to the engine system, the engine may be operated lean without increasing vehicle NOx emissions. During the lean operation (e.g., the lean imbalance testing mode), each cylinder's location on the lambda curve may be determined by comparing cylinder torque output at two or more distinct lambda settings. As an example, a slope (e.g., rate of change) can be measured between any two points on the torque-lambda curve. This relationship can be used to compare a measured slope between two distinct cylinder torque values produced at two different commanded AFRs to an expected slope for a torque change between the two different commanded AFRs, for example, in order to identify observed AFR values that differ from the commanded AFR values (e.g., an AFR offset). In this way, the controller may determine fuel adjustments that will compensate for the cylinder air imbalance while the SCR treats NOx emissions resulting from global enleanment.

In one example, the method may include determining that conditions for entering a lean imbalance testing mode are met, and in response thereto, operating in the lean imbalance testing mode; and determining that conditions for entering the lean imbalance testing mode are not met, and in response thereto, operating in a stoichiometric mode and/or not in the lean imbalance testing mode. The conditions for entering the lean imbalance testing mode may include one or more or all of an amount of ammonia stored at a selective catalytic reduction device being greater than a first threshold amount for reducing NOx emissions at the selective catalytic reduction device, an engine temperature being greater than a threshold temperature for releasing entrained fuel from crankcase cases, an exhaust temperature being within a threshold range for operating the selective catalytic reduction device, an indication that purge is disabled, and an indication that external EGR is disabled. In some examples, entering the lean imbalance testing mode occurs only after the amount of ammonia stored at the selective catalytic reduction device is greater than the first threshold amount and not before the amount of ammonia stored at the selective catalytic reduction device reaches the first threshold amount. Further, in some examples, the engine may only operate in the lean imbalance testing mode while the amount of ammonia stored at the selective catalytic reduction device is greater than a second threshold amount, less than the first threshold amount. Responsive to the amount of ammonia stored at the selective catalytic reduction device dropping below the second threshold amount while the engine is operating in the lean imbalance testing mode, the engine may transition to operating in the stoichiometric mode and may not again operate in the lean imbalance testing mode until the amount of ammonia stored at the selective catalytic reduction device reaching the first, higher threshold amount.

Further, instructions stored in memory may include instructions for determining that conditions for entering the lean imbalance testing mode are met from at least an ammonia sensor coupled to the selective catalytic reduction device, and in response to confirming that the amount of ammonia stored at the selective catalytic reduction device is greater than the first threshold amount via the ammonia sensor, operating in the lean imbalance testing mode by instructions for sending a signal to a fuel injector to adjust a pulse width of fuel delivered to each cylinder based on a lean commanded AFR. Instructions stored on memory may include instructions for determining that conditions for entering the lean imbalance testing mode are not met from at least the ammonia sensor coupled to the selective catalytic reduction device, and in response to confirming that the amount of ammonia stored at the selective catalytic reduction device is not greater than the first threshold amount via the ammonia sensor, operating in the stoichiometric mode by instructions for sending a different signal to the fuel injector.

Next, FIG. 5 shows a prophetic example timeline 500 of operating a cylinder of an engine at one or more enleanment settings to identify and correct a cylinder air imbalance. Although one cylinder is shown, it may be understood that the cylinder is included in a multi-cylinder engine system. The cylinder may be cylinder 14 shown in FIG. 1, for example, and the engine system may further include a SCR in an emissions control system (e.g., SCR 179 shown in FIGS. 1 and 2). An operating mode (e.g., whether the engine is operating at stoichiometry or in a lean imbalance testing mode) is shown in plot 502, a stored amount of $NH_3$ at the SCR is shown in plot 504, an exhaust temperature is shown in plot 506, a commanded lambda value for the engine is shown in plot 508, a mean engine torque is shown in dashed plot 510, a torque produced by the cylinder is shown in plot 512, a fuel injection amount for the cylinder is shown in plot 514, and a relative spark advance of the cylinder is shown in plot 516. Further, a first upper threshold amount of stored $NH_3$ is shown by dashed line 518, a second lower threshold amount of stored $NH_3$ is shown by dashed line 520, a first, upper threshold exhaust temperature is shown by a dashed line 522, a second, lower threshold exhaust temperature is shown by a dashed line 524, stoichiometry is shown by a dashed line 526, a first, upper threshold cylinder torque offset from mean engine torque (e.g., 0.5% above the mean engine torque) is shown by dotted plot 528, a second, lower threshold cylinder torque offset from mean engine torque (e.g., 0.5% below the mean engine torque) is shown by a dashed plot 530, and MBT spark timing is shown by a dashed line 532. Note that while MBT spark timing is shown as a flat line, an absolute spark timing of MBT may vary based on engine operating conditions, such as engine speed and load, for example.

For all of the above, the horizontal axis represents time, with time increasing along the horizontal axis from left to right. The vertical axis represents each labeled parameter.

For plots 504, 506, 508, 510, and 512, 514 and 516, a magnitude of the parameter increases up the vertical axis from bottom to top. For plot 602, the vertical axis shows whether the engine is operating in a stoichiometric mode ("stoich") or in the lean imbalance testing mode ("lean testing").

Prior to t1, the cylinder is operated in the stoichiometric mode (plot 502), with lambda set to stoichiometry (plot 508), and a spark timing retarded relative to MBT (plot 516). The stored amount of $NH_3$ (plot 504) exceeds the first upper threshold (dashed line 518) just before t1, fulfilling one of the conditions for lean imbalance testing. Further, the exhaust temperature (plot 506) is between the upper exhaust temperature threshold (dashed line 522) and the lower exhaust temperature threshold (dashed line 524). Therefore, at time t1, an engine controller determines that conditions are met for lean imbalance testing.

In response, the engine is transitioned into the lean imbalance testing mode (plot 502) in order to diagnose and correct a cylinder air imbalance. To transition the engine into the lean imbalance testing mode, the engine is commanded to run lean relative to stoichiometry. As demonstrated by plot 508, the lambda value increases accordingly at time t1. As demonstrated by plot 514, the engine is commanded to decrease a fuel injection amount at t1 to achieve the commanded lambda value. For example, the controller may decrease the fuel injection amount by adjusting a pulse width of a signal FPW sent to the fuel injector of each cylinder based on the commanded AFR of the cylinder. Enleanment increases combustion temperature, as demonstrated in plot 506, which in turn increases NOx production during engine operation. Because the engine system includes the SCR and the stored amount of $NH_3$ (plot 504) is greater than the upper threshold (dashed line 518), the global enleanment used during the lean imbalance testing mode does not lead to an increase NOx emissions.

Between time t1 and time t2, the engine operates at a first lean lambda (plot 508). During this time period, the engine controller measures the crankshaft acceleration produced by each cylinder of the engine and uses the calculated crankshaft accelerations to determine the amount of torque produced by each engine cylinder, including the individual torque produced by the cylinder of timeline 500 (plot 512). The controller also determines the mean cylinder torque (plot 510). Further, the stored amount of $NH_3$ (plot 504) decreases between time t1 and time t2 as $NH_3$ is consumed during NOx conversion at the SCR.

At t2, the controller determines that a relative cylinder imbalance exists between the cylinder, shown by plot 512, and the mean cylinder torque, shown by plot 510, due to the individual cylinder torque being at least a threshold amount less than the mean torque. The threshold deviation from the mean torque is 0.5%, shown graphically by the first, upper threshold 528 and the second, lower threshold 530. A cylinder may be determined to be imbalanced when the individual cylinder torque is more than 0.5% greater than the mean engine torque (e.g., when the individual cylinder torque exceeds the first, upper threshold), for example. In another example, a cylinder may be determined to be imbalanced when the individual cylinder torque is more than 0.5% lower than the mean engine torque (e.g., when the individual cylinder torque is lower than the second, lower threshold). In the illustrative, non-limiting example of FIG. 5, the imbalanced cylinder produces less torque (plot 512) than the mean engine torque (plot 510), and thus is operating at a lower lambda value than the commanded lambda value. Further, the imbalanced cylinder produces less torque (plot 512) than the second, lower threshold (dotted line 530). Responsive to detecting the relative imbalance (e.g., the cylinder torque is more than 0.5% less than the mean engine torque) at time t2, the engine controller begins to command a series of lean lambda values in order to characterize the imbalanced cylinder's torque response, as well as every other cylinder of the engine, and map this response onto the torque-lambda relationship described in FIG. 4. Thus, at t2, the engine is commanded to run at a new, lean lambda (e.g., a second lean lambda). As demonstrated by plot 508, this second lean lambda is richer than the lambda value commanded between t1 and t2, but leaner than stoichiometric operation. As demonstrated by plot 514, the engine adjusts the fuel injection amount (e.g., increases the fuel injection amount) to achieve this new, lean lambda value. For example, the controller may increase the fuel injection amount by adjusting a pulse width of a signal FPW sent to the fuel injector of each cylinder based on the commanded lambda of the cylinder.

Between t2 and t3, the engine operates at the second lean lambda value. During this time period, the engine controller measures the crankshaft acceleration produced by each cylinder of the engine and uses the calculated crankshaft accelerations to determine the amount of torque produced by each engine cylinder, including the individual torque produced by the cylinder of timeline 500 (plot 512). Because enleanment increases combustion temperatures, the exhaust temperature continues to rise between t2 and t3. However, because the second lean lambda value is richer relative to the first lean lambda value, the exhaust temperature rises at a slower rate between t2 and t 3 than between t1 and t2. Further, the stored amount of $NH_3$ (plot 504) decreases between time t2 and time t3, as $NH_3$ is consumed by NOx conversion in the SCR.

At t3, the engine controller determines whether the conditions for exiting the lean imbalance testing mode are met. The conditions for exiting the lean imbalance testing mode may include an exhaust temperature exceeding the first, upper threshold (dashed line 518), the stored amount of $NH_3$ dropping below the second, lower threshold (dashed line 520), or the controller determining that a sufficient number of data samples have been recorded. At t3, the stored amount of $NH_3$ (plot 504) is between the first, upper threshold (dashed line 518) and the second, lower threshold (dashed line 520), and the exhaust temperature (plot 506) is between the first, upper threshold (dashed line 522) and the second, lower threshold (dashed line 524). Thus, the controller determines that the conditions for exiting the lean imbalance testing mode are not met.

Continuing in the lean imbalance testing mode, the engine is operated at a third lean lambda at t3. As demonstrated by plot 508, the third lean lambda is closer to stoichiometry than the lambda value between t1 and t2 (e.g., the first lean lambda) or the lambda value between t2 or t3 (e.g., the second lean lambda). Between t3 and t4, the exhaust temperature (plot 506) continues to increase, and the amount of stored $NH_3$ (plot 504) continues to decrease as the stored $NH_3$ is used during catalytic conversion of NOx emissions in the SCR. During this time, the engine controller continues to measure the crankshaft acceleration produced by each cylinder of the engine and uses the calculated crankshaft accelerations to determine the amount of torque produced by each engine cylinder, including the imbalanced cylinder shown in plot 512. As demonstrated by plot 512, the cylinder torque between t3 and t4 increases relative to the cylinder torque produced between t2 and t3, but is lower than the cylinder torque produced at stoichiometric operation (e.g., before t1).

At t4, the controller again determines that the conditions are not met to exit the lean imbalance testing mode. Thus, the engine is operated at a fourth lean lambda. As demonstrated by plot 508, the fourth lean lambda is leaner (e.g., higher) than any of the first, second, or third lean lambda values. Between t4 and t5, the cylinder torque decreases more rapidly than any other point between t1 and t4, demonstrating the non-linear relationship between torque and lambda shown in plot 400 of FIG. 4. Further, between t4 and t5, the stored amount of $NH_3$ decreases, while the exhaust temperature increases. Between t4 and t5, the controller continues to measure the crankshaft acceleration produced by each cylinder and uses the calculated crankshaft accelerations to determine the amount of torque produced by each engine cylinder, including the imbalanced cylinder shown in plot 512. As demonstrated by plot 512, the cylinder torque decreases between t4 and t5.

At time t5, the stored value of $NH_3$ (plot 504) drops below the second, lower threshold (dashed line 520). This second, lower threshold may be determined by the amount of stored $NH_3$ for the engine to continue operating lean without increasing NOx emissions. At time t5, responsive to the stored amount of $NH_3$ dropping below the lower threshold (dashed line 520), the engine leaves the lean imbalance testing mode (plot 502) and returns to stoichiometric operation. For example, lambda (plot 508) returns to stoichiometry. Thus at t5, the lean imbalance testing is complete, and the engine exits the lean imbalance testing mode.

Between t5 and t6, the controller makes adjustments to cylinder fueling according to the torque-lambda mapping performed during the lean imbalance testing mode. First, the fuel injection amount (plot 514) is shown to increase (e.g., enriched operation), as the controller attempts to increase the torque output of the unbalanced cylinder (plot 512) relative to the mean cylinder torque (dashed plot 510). For example, the controller may increase the fueling amount by adjusting the pulse width of a signal FPW sent to the fuel injector of the cylinder. As an example, the controller may adjust the fueling amount by a pre-determined amount that compensates for the torque offset calculated during the lean imbalance testing mode. As demonstrated in plot 512, the cylinder torque increases as a result of these adjustments, but is still outside the range defined by dotted lines 528 and 530. Finally, between t6 and t7, the engine controller adjusts the spark timing to correct any remaining imbalance between cylinders. In the example shown in timeline 500, the spark timing of the cylinder is increased toward MBT (plot 516) in order to further increase the cylinder torque (plot 512) to the mean engine torque (dashed line 510). As a result, the initially imbalanced cylinder is balanced with the mean engine torque at t7, while the exhaust temperature (plot 506) has remained within a range bounded by the lower threshold temperature (dashed line 524) and the upper threshold temperature (dashed line 522).

In this way, a spark-ignition engine equipped with an SCR may be operated with a series of enleaned lambda values to enable mapping measured cylinder torque to lambda based on a known relationship between torque and lambda. For example, several data points of measured cylinder torque for a given commanded lambda may allow an engine controller to determine an effective AFR offset for an imbalanced cylinder, which may be corrected through fueling and ignition timing adjustments. As a result, the engine controller may monitor and compensate for cylinder air imbalances in order to bring the engine into balanced operation. Further, the cylinder air imbalances may be specifically differentiated from other sources of AFR imbalances by performing a lean imbalance test while sources of unmetered fuel are eliminated and/or reduced. By including the SCR, the lean imbalance test can be performed without increasing vehicle NOx emissions. Overall, the cylinder air imbalance monitoring may increase fuel efficiency, increase engine smoothness, increase customer satisfaction, and decrease vehicle emissions relative to engine systems with unbalanced cylinders.

The technical effect of including a selective catalytic reduction (SCR) system for identifying and correcting a cylinder imbalance during lean engine operation is that air distribution-specific cylinder imbalances may be identified and compensated for, enabling accurate cylinder operation at a commanded AFR, while emissions control is not degraded during the lean engine operation.

In one example, a method comprises: diagnosing a torque imbalance in a multi-cylinder engine by operating the engine at a lean air-fuel ratio (AFR) while an amount of ammonia stored in an selective catalytic reduction system is greater than a threshold amount and a temperature of the engine is greater than a threshold temperature; and responsive to the torque imbalance, adjusting fueling based on an AFR offset of each cylinder determined while adjusting the lean AFR. In the preceding example, additionally or optionally, diagnosing the torque imbalance in the multi-cylinder engine includes: operating the engine at the lean AFR while determining a cylinder torque produced by each cylinder of the multi-cylinder engine; averaging the cylinder torque produced by each cylinder to determine a mean cylinder torque; and identifying the torque imbalance responsive to the cylinder torque produced by one or more cylinders being outside of a threshold deviation from the mean cylinder torque. In one or both of the preceding examples, additionally or optionally, determining the cylinder torque produced by each cylinder includes measuring a crankshaft acceleration produced by each cylinder. In any or all of the preceding examples, additionally or optionally, determining the AFR offset of each cylinder while adjusting the lean AFR includes: commanding a series of lean AFRs while monitoring a torque output of each cylinder at each lean commanded AFR in the series of lean AFRs; and determining the AFR offset of each cylinder based on a change in the torque output of the corresponding cylinder between two consecutive lean commanded AFRs in the series of lean AFRs and a difference between the consecutive lean commanded AFRs. In any or all of the preceding examples, additionally or optionally, determining the AFR offset of each cylinder based on the change in the torque output of the corresponding cylinder between two consecutive lean commanded AFRs in the series of lean AFRs and the difference between the consecutive lean commanded AFRs includes mapping a ratio of the change in the torque output and the difference between the consecutive lean commanded AFRs to a torque-AFR function. In any or all of the preceding examples, additionally or optionally, adjusting the fueling includes adjusting a fuel injection amount of each cylinder based on the corresponding AFR offset of each cylinder. In any or all of the preceding examples, additionally or optionally, diagnosing the torque imbalance includes learning fuel injector offsets before operating the engine at the lean AFR, the threshold temperature is above a temperature for releasing entrained fuel from a crankcase of the engine, and a source of the torque imbalance includes an air distribution difference between one or more cylinders of the multi-cylinder engine. In any or all of the preceding examples, additionally or optionally, the first threshold amount is a threshold amount of ammonia for NOx conversion by the selective catalytic reduction system while operating the engine at the lean AFR. In any or all of the preceding examples, the method additionally or optionally further comprises: responsive to the amount of ammonia stored in the selective catalytic reduction system being less than the threshold amount, storing additional ammonia at the selective catalytic reduction system; and waiting until the amount of amount of ammonia stored in the selective catalytic reduction system is greater than the threshold amount before diagnosing the torque imbalance. In any or all of the preceding examples, the method additionally or optionally further comprises: transitioning the engine to operating at stoichiometry responsive to the amount of ammonia stored in the selective catalytic reduction system decreasing below the threshold amount while operating the engine at the lean AFR.

As another example, a method comprises: after storing a threshold amount of ammonia in a selective catalytic reduction (SCR) system, balancing torque output of each cylinder of a multi-cylinder engine based on an offset of each cylinder determined while commanding engine operation at a series of lean air-fuel ratios (AFRs), exhaust gas from the engine remaining above a first temperature threshold and below a second temperature threshold during the balancing. In the preceding example, additionally or optionally, balancing the torque output of each cylinder of the multi-cylinder based on the offset of each cylinder determined while commanding engine operation at the series of lean AFRs includes: operating the engine at a first lean AFR in the series of lean AFRs; and identifying an air imbalance in one or more cylinders by comparing a first individual cylinder torque produced by each cylinder while operating the engine at the first lean AFR to a mean cylinder torque produced while operating the engine at the first lean AFR. In one or both of the preceding examples, additionally or optionally, balancing the torque output of each cylinder further includes: responsive to identifying the air imbalance in the one or more cylinders, operating the engine at a second lean AFR in the series of lean AFRs; determining a second individual cylinder torque produced by each cylinder while operating the engine at the second lean AFR; and determining a torque-AFR slope of each cylinder based on a torque difference between the first individual cylinder torque and the second individual cylinder torque and a difference between the first lean AFR and the second lean AFR. In any or all of the preceding examples, additionally or optionally, balancing the torque output of each cylinder further includes: determining a first observed AFR and a second observed AFR of each cylinder by mapping the torque-AFR slope of each cylinder to a torque-AFR function; determining the offset of each cylinder by comparing the first observed AFR and the second observed AFR of each cylinder to the first lean AFR and the second lean AFR; and adjusting a fuel injection amount of each cylinder based on the determined offset of the cylinder. In any or all of the preceding examples, additionally or optionally, the first threshold temperature is a light-off temperature of the SCR system, the second threshold temperature is a threshold for reducing heat-related degradation of the SCR system, and the threshold amount of ammonia is calibrated to reduce NOx emissions during commanding engine operation at the series of lean AFRs.

As another example, a system comprises: a spark ignition engine including a plurality of cylinders; a selective catalytic reduction (SCR) device coupled in an exhaust passage of the engine; and a controller with computer readable instructions stored in non-transitory memory that, when executed during engine operation, cause the controller to: operate in a lean imbalance testing mode responsive to a threshold amount of ammonia being stored in the SCR device; and identify a cylinder air imbalance based on a torque produced by each of the plurality of cylinders relative to a mean torque produced by all of the plurality of cylinders while operating in the lean imbalance testing mode. In the preceding example, additionally or optionally, to operate in the lean imbalance testing mode, the controller includes further instructions stored in non-transitory memory that, when executed, cause the controller to: operate the engine at a series of lean air-fuel ratios; and determine the torque produced by each of the plurality of cylinders at each lean air-fuel ratio in the series of lean air-fuel ratios. In one or both of the preceding examples, additionally or optionally, the controller includes further instructions stored in non-transitory memory that, when executed while operating in the lean imbalance testing mode, cause the controller to: for each of the plurality of cylinders, determine an air-fuel ratio offset by mapping a change in the torque produced by the cylinder between consecutive lean air-fuel ratios in the series of lean air-fuel ratios to a relationship of torque and air-fuel ratio. In any or all of the preceding examples, additionally or optionally, the controller includes further instructions stored in non-transitory memory that, when executed, cause the controller to: adjust a fuel injection amount of each cylinder based on the air-fuel ratio off-set determined for the corresponding cylinder; and after adjusting the fuel injection amount, perform torque balancing between cylinders based on the torque produced by each of the plurality of cylinders relative to the mean torque produced by all of the plurality of cylinders using spark timing adjustments. In any or all of the preceding examples, the system additionally or optionally further comprises an evaporative emissions system, including a fuel vapor storage canister coupled to a fuel tank, the fuel vapor storage canister coupled to an intake passage of the engine via a purge line with a canister purge valve disposed therein, and operating in the lean imbalance testing mode is further responsive to the canister purge valve being fully closed and a temperature of the engine being greater than a threshold.

In another representation, a method comprises: correcting a cylinder air imbalance in an engine based on a relative torque produced by each cylinder of the engine while operating the engine lean, the operating the engine lean performed after storing a threshold amount of ammonia at a selective catalytic reduction (SCR) system. In the preceding example, additionally or optionally, the SCR system is coupled in an exhaust system of the engine downstream of a three-way catalyst. In one or both of the preceding examples, additionally or optionally, the SCR system is coupled in the exhaust system of the engine downstream of a lean NOx trap. In any or all of the preceding examples, additionally or optionally, storing the threshold amount of ammonia includes operating the engine rich to generate ammonia at the three-way catalyst and lean NOx trap until the amount of ammonia stored at the SCR system reaches the threshold amount. In any or all of the preceding examples, additionally or optionally, correcting the cylinder air imbalance based on the relative torque produced by each cylinder of the engine includes: comparing an individual torque produced by each cylinder to an average torque produced by every cylinder over an engine cycle to identify a cylinder having the cylinder air imbalance; and determining an air-fuel ratio (AFR) offset of the cylinder having the cylinder air imbalance by mapping the individual torque produced by the cylinder to a curve relating torque to AFR at a plurality of lean AFRs. In any or all of the preceding examples, correcting the cylinder air imbalance further includes adjusting fueling to the cylinder based on the determined AFR offset.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
diagnosing a torque imbalance in a multi-cylinder engine while operating the engine at a lean air-fuel ratio (AFR), in response to determining that an amount of ammonia stored in an selective catalytic reduction system is greater than a threshold amount and a temperature of the engine is greater than a threshold temperature; and
responsive to the torque imbalance, adjusting fueling based on an AFR offset of each cylinder determined while adjusting the lean AFR.

2. The method of claim 1, wherein diagnosing the torque imbalance in the multi-cylinder engine includes:
operating the engine at the lean AFR while determining a cylinder torque produced by each cylinder of the multi-cylinder engine;
averaging the cylinder torque produced by each cylinder to determine a mean cylinder torque; and
identifying the torque imbalance responsive to the cylinder torque produced by one or more cylinders being outside of a threshold deviation from the mean cylinder torque.

3. The method of claim 2, wherein determining the cylinder torque produced by each cylinder includes measuring a crankshaft acceleration produced by each cylinder.

4. The method of claim 1, wherein determining the AFR offset of each cylinder while adjusting the lean AFR includes:
commanding a series of lean AFRs while monitoring a torque output of each cylinder at each lean commanded AFR in the series of lean AFRs; and
determining the AFR offset of each cylinder based on a change in the torque output of the corresponding cylinder between two consecutive lean commanded AFRs in the series of lean AFRs and a difference between the consecutive lean commanded AFRs.

5. The method of claim 4, wherein determining the AFR offset of each cylinder based on the change in the torque output of the corresponding cylinder between two consecutive lean commanded AFRs in the series of lean AFRs and the difference between the consecutive lean commanded AFRs includes mapping a ratio of the change in the torque output and the difference between the consecutive lean commanded AFRs to a torque-AFR function.

6. The method of claim 4, wherein adjusting the fueling includes adjusting a fuel injection amount of each cylinder based on the corresponding AFR offset of each cylinder.

7. The method of claim 1, wherein diagnosing the torque imbalance includes learning fuel injector offsets before operating the engine at the lean AFR, the threshold temperature is above a temperature for releasing entrained fuel from a crankcase of the engine, and a source of the torque imbalance includes an air distribution difference between one or more cylinders of the multi-cylinder engine.

8. The method of claim 1, wherein the first threshold amount is a threshold amount of ammonia for NOx conversion by the selective catalytic reduction system while operating the engine at the lean AFR.

9. The method of claim 1, further comprising:
responsive to the amount of ammonia stored in the selective catalytic reduction system being less than the threshold amount, storing additional ammonia at the selective catalytic reduction system; and
waiting until the amount of amount of ammonia stored in the selective catalytic reduction system is greater than the threshold amount before diagnosing the torque imbalance.

10. The method of claim 1, further comprising:
transitioning the engine to operating at stoichiometry responsive to the amount of ammonia stored in the selective catalytic reduction system decreasing below the threshold amount while operating the engine at the lean AFR.

11. A method, comprising:
storing at least a threshold amount of ammonia in a selective catalytic reduction (SCR) system; and
balancing torque output of each cylinder of a multi-cylinder engine based on an offset of each cylinder determined while commanding engine operation at a series of lean air-fuel ratios (AFRs), in response to determining that the stored ammonia amount is at least the threshold amount;
wherein exhaust gas from the engine remains above a first temperature threshold and below a second temperature threshold during the balancing.

12. The method of claim 11, wherein balancing the torque output of each cylinder of the multi-cylinder based on the offset of each cylinder determined while commanding engine operation at the series of lean AFRs includes:
operating the engine at a first lean AFR in the series of lean AFRs; and
identifying an air imbalance in one or more cylinders by comparing a first individual cylinder torque produced by each cylinder while operating the engine at the first lean AFR to a mean cylinder torque produced while operating the engine at the first lean AFR.

13. The method of claim 12, wherein balancing the torque output of each cylinder further includes:
responsive to identifying the air imbalance in the one or more cylinders, operating the engine at a second lean AFR in the series of lean AFRs;
determining a second individual cylinder torque produced by each cylinder while operating the engine at the second lean AFR; and
determining a torque-AFR slope of each cylinder based on a torque difference between the first individual cylinder torque and the second individual cylinder torque and a difference between the first lean AFR and the second lean AFR.

14. The method of claim 13, wherein balancing the torque output of each cylinder further includes:
determining a first observed AFR and a second observed AFR of each cylinder by mapping the torque-AFR slope of each cylinder to a torque-AFR function;
determining the offset of each cylinder by comparing the first observed AFR and the second observed AFR of each cylinder to the first lean AFR and the second lean AFR; and
adjusting a fuel injection amount of each cylinder based on the determined offset of the cylinder.

15. The method of claim 11, wherein the first threshold temperature is a light-off temperature of the SCR system, the second threshold temperature is a threshold for reducing heat-related degradation of the SCR system, and the threshold amount of ammonia is calibrated to reduce NOx emissions during commanding engine operation at the series of lean AFRs.

16. A system, comprising:
a spark ignition engine including a plurality of cylinders;
a selective catalytic reduction (SCR) device coupled in an exhaust passage of the engine; and
a controller with computer readable instructions stored in non-transitory memory that, when executed during engine operation, cause the controller to:
operate in a lean imbalance testing mode responsive to determining that at least a threshold amount of ammonia is being stored in the SCR device; and
identify a cylinder air imbalance based on a torque produced by each of the plurality of cylinders relative to a mean torque produced by all of the plurality of cylinders while operating in the lean imbalance testing mode.

17. The system of claim 16, wherein to operate in the lean imbalance testing mode, the controller includes further instructions stored in non-transitory memory that, when executed, cause the controller to:
operate the engine at a series of lean air-fuel ratios; and
determine the torque produced by each of the plurality of cylinders at each lean air-fuel ratio in the series of lean air-fuel ratios.

18. The system of claim 17, wherein the controller includes further instructions stored in non-transitory memory that, when executed while operating in the lean imbalance testing mode, cause the controller to:
for each of the plurality of cylinders, determine an air-fuel ratio offset by mapping a change in the torque produced by the cylinder between consecutive lean air-fuel ratios in the series of lean air-fuel ratios to a relationship of torque and air-fuel ratio.

19. The system of claim 18, wherein the controller includes further instructions stored in non-transitory memory that, when executed, cause the controller to:
adjust a fuel injection amount of each cylinder based on the air-fuel ratio off-set determined for the corresponding cylinder; and
after adjusting the fuel injection amount, perform torque balancing between cylinders based on the torque produced by each of the plurality of cylinders relative to the mean torque produced by all of the plurality of cylinders using spark timing adjustments.

20. The system of claim 16, further comprising an evaporative emissions system, including a fuel vapor storage canister coupled to a fuel tank, the fuel vapor storage canister coupled to an intake passage of the engine via a purge line with a canister purge valve disposed therein, and wherein operating in the lean imbalance testing mode is further responsive to the canister purge valve being fully closed and a temperature of the engine being greater than a threshold.

* * * * *